(12) United States Patent
Rapaport et al.

(10) Patent No.: US 8,210,973 B2
(45) Date of Patent: Jul. 3, 2012

(54) SPORT BALL BLADDER

(75) Inventors: Zvi Rapaport, Portland, OR (US);
Vincent F. White, Beaverton, OR (US);
Bhupesh Dua, Portland, OR (US)

(73) Assignee: Nike, Inc., Beaverton, OR (US)

( * ) Notice: Subject to any disclaimer, the term of this patent is extended or adjusted under 35 U.S.C. 154(b) by 55 days.

(21) Appl. No.: 12/147,943

(22) Filed: Jun. 27, 2008

(65) Prior Publication Data
US 2009/0325745 A1  Dec. 31, 2009

(51) Int. Cl.
A63B 41/00  (2006.01)
(52) U.S. Cl. .......................... 473/604; 473/605; 473/609
(58) Field of Classification Search .................. 473/599, 473/603–605, 609, 606, 610, 611
See application file for complete search history.

(56) References Cited

U.S. PATENT DOCUMENTS

| | | | |
|---|---|---|---|
| 414,748 A | 11/1889 | Bentley | |
| 1,151,396 A * | 8/1915 | Roberts | 473/609 |
| 1,517,859 A | 12/1924 | O'Shea | |
| 1,566,974 A * | 12/1925 | Saunders | 473/609 |
| 1,575,281 A | 3/1926 | Rosenberg | |
| 1,820,124 A * | 8/1931 | Dorogi et al. | 473/609 |
| 1,917,535 A | 7/1933 | Maynard | |
| 1,932,226 A | 10/1933 | Pierce | |
| 1,967,908 A | 7/1934 | Sneary | |
| 2,009,237 A | 7/1935 | McGall | |
| 2,012,376 A | 8/1935 | Caro | |
| 2,018,559 A | 10/1935 | Homer | |
| 2,073,766 A | 3/1937 | Suzuki | |
| 2,080,894 A | 5/1937 | Levinson | |
| 2,126,220 A | 8/1938 | Scudder | |
| 2,300,441 A | 11/1942 | Voit et al. | |
| 2,325,073 A | 7/1943 | Reach | |
| 2,344,638 A | 3/1944 | Reeder | |
| 2,444,150 A * | 6/1948 | Best | 473/604 |
| 2,819,753 A * | 1/1958 | Nogue | 473/604 |
| 2,945,693 A | 7/1960 | Way | |
| 3,512,777 A | 5/1970 | Henderson | |
| 4,154,789 A | 5/1979 | Delacoste | |
| 4,436,276 A | 3/1984 | Donahue | |
| 4,462,590 A * | 7/1984 | Mitchell | 473/603 |
| 4,513,058 A * | 4/1985 | Martin | 473/603 |
| 4,610,071 A | 9/1986 | Miller | |

(Continued)

FOREIGN PATENT DOCUMENTS
BR  8503534  3/1987
(Continued)

OTHER PUBLICATIONS

International Search Report and Written Opinion for PCT/US2009/045394, mailed Nov. 17, 2009.

*Primary Examiner* — Steven Wong
(74) *Attorney, Agent, or Firm* — Plumsea Law Group, LLC

(57) ABSTRACT

A sport ball may include a casing and a bladder. The casing may form at least a portion of an exterior surface of the ball. The bladder may be located within the casing and formed from a plurality of polymer bladder elements joined along abutting edges to form a sealed and valveless structure that encloses a pressurized gas. In some configurations, the bladder may be at least partially formed from an ether-based thermoplastic polyurethane material.

14 Claims, 25 Drawing Sheets

U.S. PATENT DOCUMENTS

Figure 1:
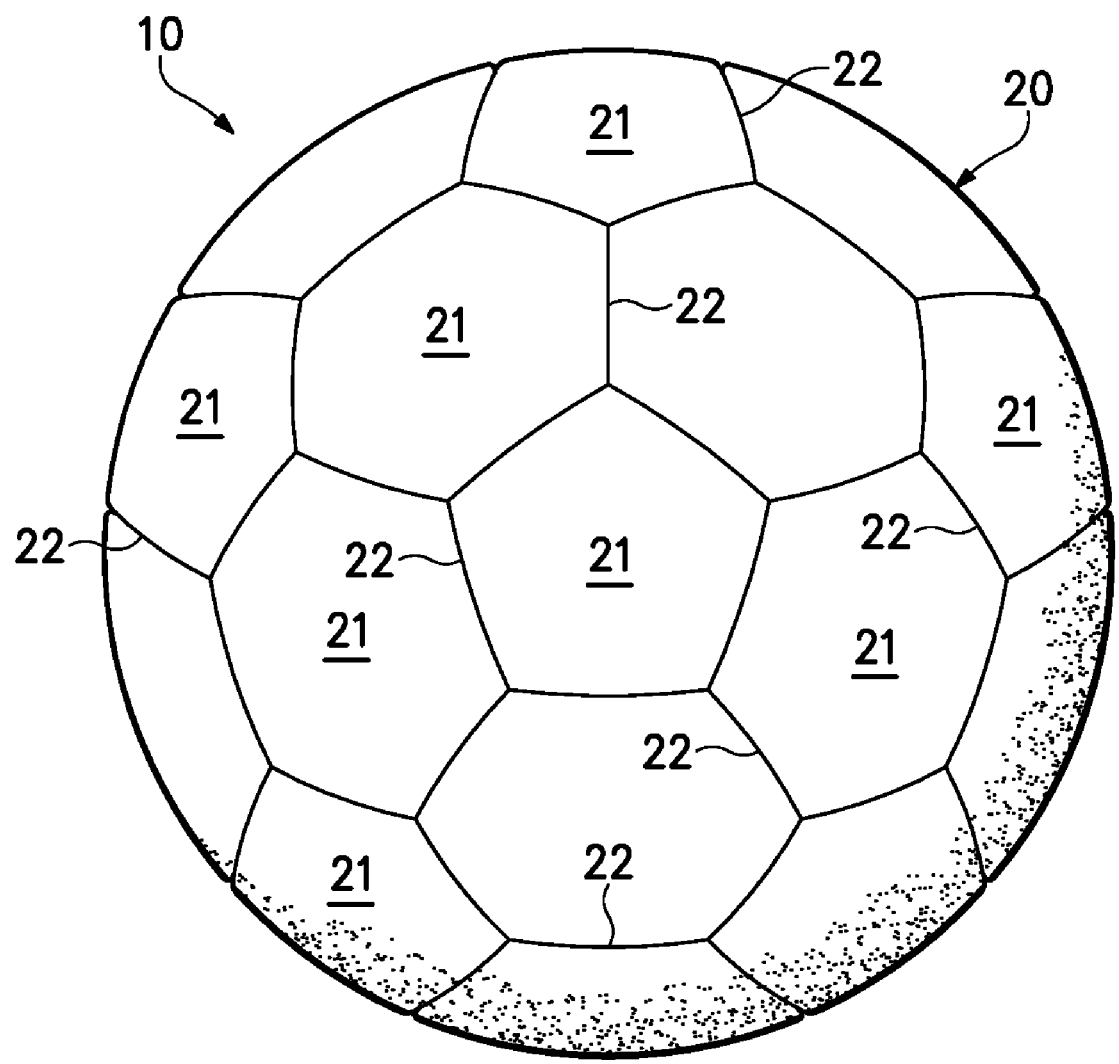

| | | | |
|---|---|---|---|
| 4,660,831 A * | 4/1987 | Kralik | 473/603 |
| 4,765,853 A | 8/1988 | Hoffman | |
| 4,834,382 A * | 5/1989 | Spector | 473/603 |
| 4,880,233 A | 11/1989 | Song | |
| D322,105 S | 12/1991 | Ma | |
| 5,096,756 A * | 3/1992 | Walters | 473/610 |
| 5,123,659 A | 6/1992 | Williams | |
| 5,181,717 A | 1/1993 | Donntag et al. | |
| 5,250,070 A | 10/1993 | Parodi | |
| 5,294,112 A * | 3/1994 | Smith | 473/610 |
| 5,354,053 A | 10/1994 | Ratner et al. | |
| 5,380,002 A * | 1/1995 | Spector | 473/519 |
| 5,492,425 A * | 2/1996 | Carter et al. | 401/10 |
| 5,494,625 A | 2/1996 | Hu | |
| 5,503,699 A | 4/1996 | Ratner et al. | |
| 5,593,157 A * | 1/1997 | Koros et al. | 473/606 |
| 5,603,497 A | 2/1997 | Louez | |
| 5,649,701 A * | 7/1997 | Mills et al. | 473/604 |
| 5,888,157 A | 3/1999 | Guenther et al. | |
| 6,012,997 A | 1/2000 | Mason | |
| 6,142,897 A | 11/2000 | Lees | |
| 6,206,795 B1 * | 3/2001 | Ou | 473/599 |
| 6,261,400 B1 | 7/2001 | Kennedy, III | |
| 6,302,815 B1 | 10/2001 | Shishido et al. | |
| 6,461,461 B2 | 10/2002 | Kennedy, III | |
| 6,629,902 B2 | 10/2003 | Murphy et al. | |
| 6,645,099 B2 | 11/2003 | Gaff et al. | |
| 6,685,585 B2 | 2/2004 | Shishido et al. | |
| 6,726,582 B1 | 4/2004 | Kuo et al. | |
| 6,971,965 B1 | 12/2005 | Shishido | |
| 6,991,569 B2 | 1/2006 | Dobrounig | |
| 7,005,025 B2 | 2/2006 | Summers | |
| 7,029,407 B2 | 4/2006 | Lee et al. | |
| 7,066,853 B2 | 6/2006 | Chang | |
| 2002/0086749 A1 | 7/2002 | Ou | |
| 2003/0125141 A1 * | 7/2003 | Chang | 473/605 |
| 2003/0203780 A1 | 10/2003 | Guenther et al. | |
| 2004/0077288 A1 | 4/2004 | Krysiak et al. | |
| 2004/0144477 A1 * | 7/2004 | Taniguchi et al. | 156/147 |
| 2004/0229722 A1 | 11/2004 | Liu | |
| 2005/0081982 A1 | 4/2005 | Chen | |
| 2005/0229985 A1 | 10/2005 | Saxenfelt | |
| 2006/0063622 A1 | 3/2006 | Nurnberg et al. | |
| 2006/0229149 A1 | 10/2006 | Goedoen | |
| 2006/0293132 A1 * | 12/2006 | Laliberty et al. | 473/603 |
| 2007/0049434 A1 | 3/2007 | Maziarz et al. | |
| 2007/0129188 A1 * | 6/2007 | Maziarz et al. | 473/603 |
| 2008/0108462 A1 * | 5/2008 | Krysiak | 473/603 |
| 2008/0188333 A1 * | 8/2008 | Tsai | 473/604 |
| 2009/0288312 A1 * | 11/2009 | Dua | 36/29 |

FOREIGN PATENT DOCUMENTS

| | | |
|---|---|---|
| EP | 0598542 | 5/1994 |
| FR | 2572674 | 5/1986 |
| JP | 10337341 | 12/1998 |
| JP | 2004194860 | 7/2004 |

* cited by examiner

SPORT BALL BLADDER

BACKGROUND

A variety of inflatable sport balls, such as a soccer ball, conventionally exhibit a layered structure that includes a casing, an intermediate layer, and a bladder. The casing forms an exterior layer of the sport ball and is generally formed from a plurality of durable, wear-resistant panels joined together along abutting edges (e.g., with stitching or adhesives). Although panel configurations may vary significantly, the casing of a traditional soccer ball includes thirty-two panels, twelve of which have a pentagonal shape and twenty of which have a hexagonal shape. The intermediate layer forms a middle layer of the sport ball and is positioned between the bladder and the casing to restrict expansion of the bladder. The bladder, which generally has an inflatable configuration, is located within the intermediate layer to provide an inner layer of the sport ball. In order to facilitate inflation (i.e., with air), the bladder generally includes a valved opening that extends through each of the intermediate layer and casing, thereby being accessible from an exterior of the sport ball.

SUMMARY

A sport ball may include a casing and a bladder. The casing may form at least a portion of an exterior surface of the ball. The bladder may be located within the casing and formed from a plurality of polymer bladder elements joined along abutting edges to form a sealed and valveless structure that encloses a pressurized gas. In some configurations, the bladder may be at least partially formed from an ether-based thermoplastic polyurethane material.

In manufacturing a bladder for a sport ball, a variety of processes may be utilized. As an example, a thermoforming process may be utilized to shape and join bladder elements. As another example, bladder elements may be cut from a planar sheet of polymer material and joined along abutting edges to form a sealed structure for retaining a pressurized gas.

The advantages and features of novelty characterizing aspects of the invention are pointed out with particularity in the appended claims. To gain an improved understanding of the advantages and features of novelty, however, reference may be made to the following descriptive matter and accompanying figures that describe and illustrate various configurations and concepts related to the invention.

FIGURE DESCRIPTIONS

The foregoing Summary and the following Detailed Description will be better understood when read in conjunction with the accompanying figures.

Figure 2:
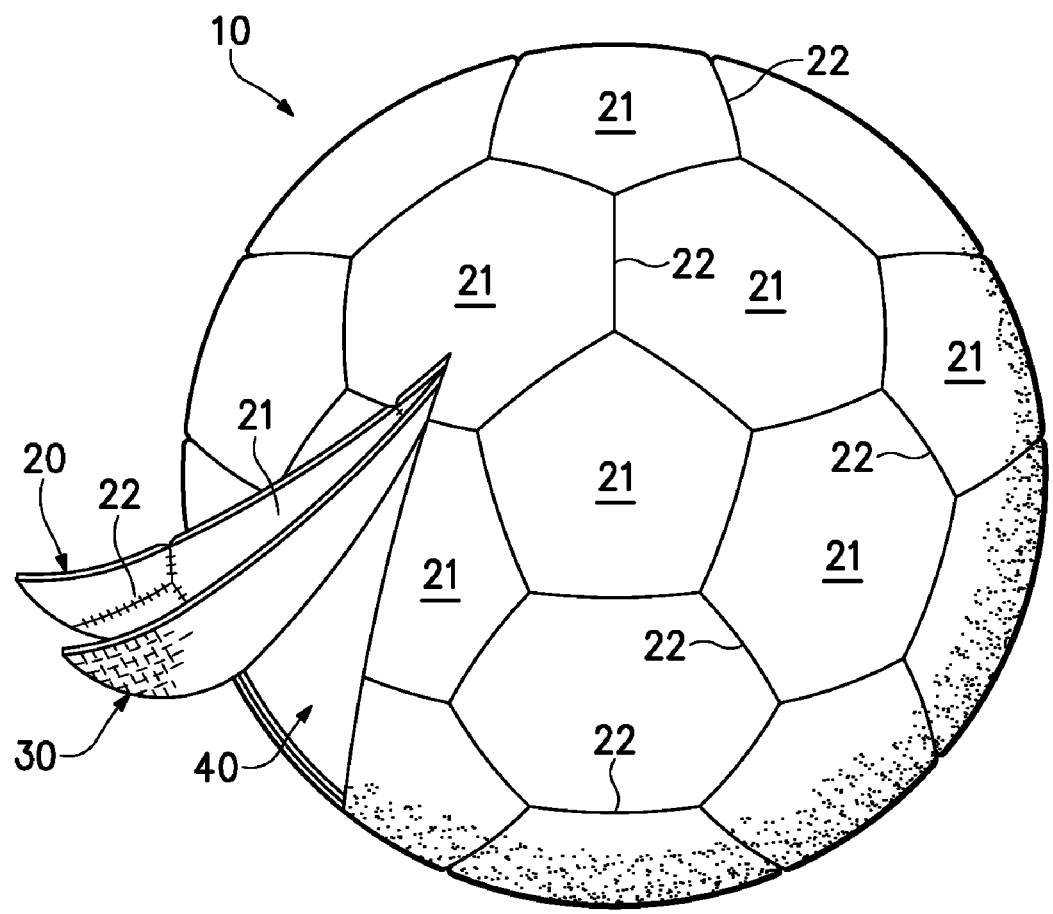
Figure 3:
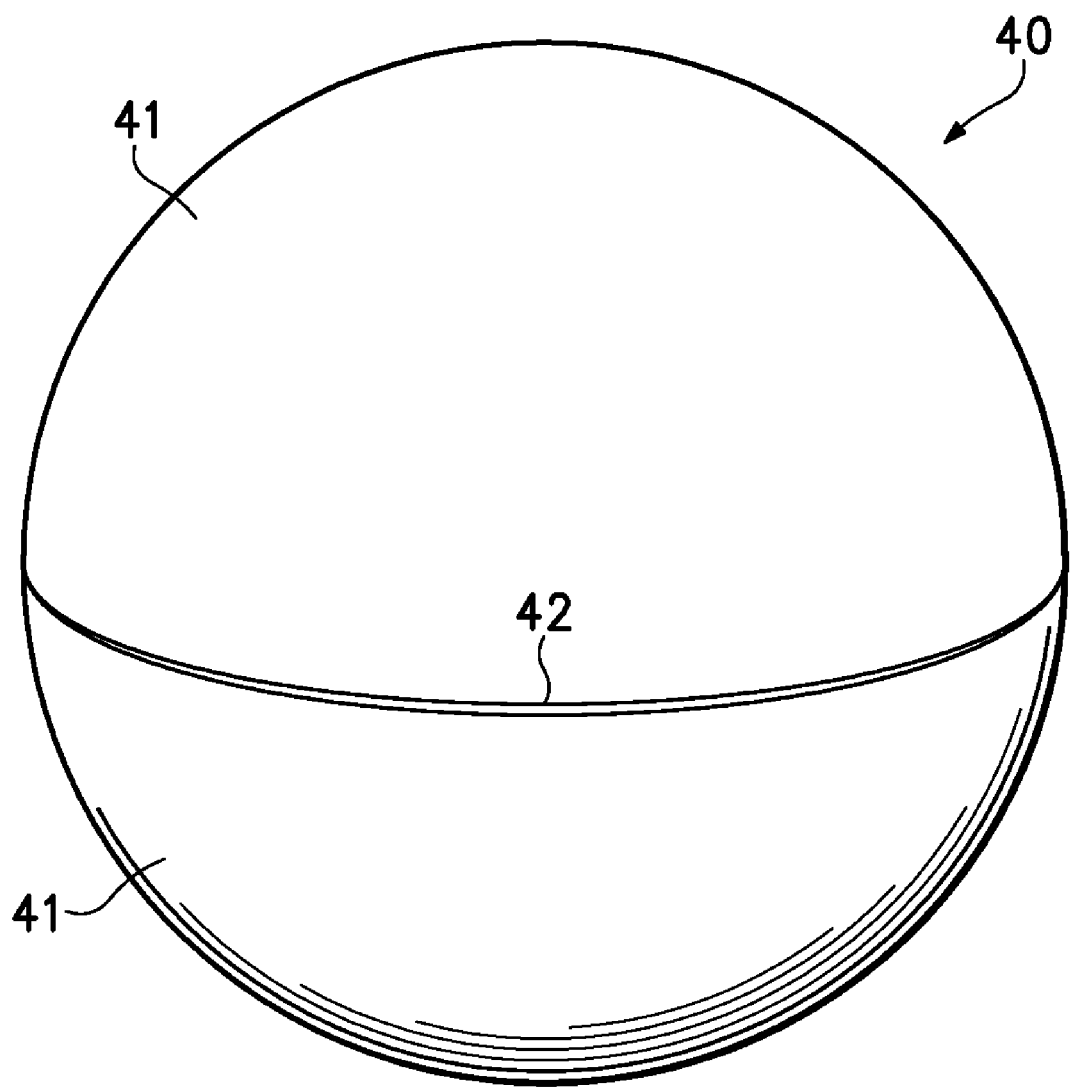
Figure 4A:
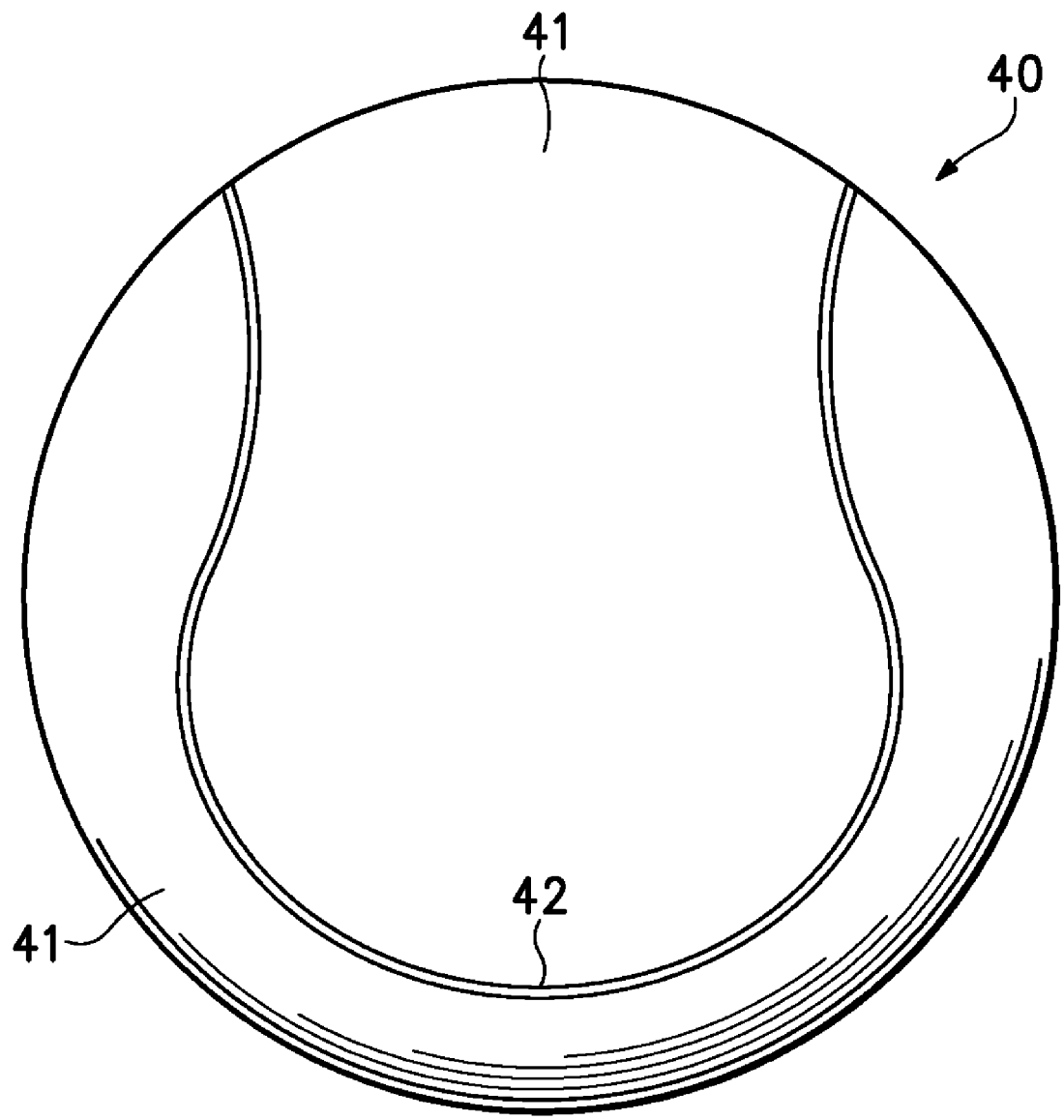
Figure 4B:
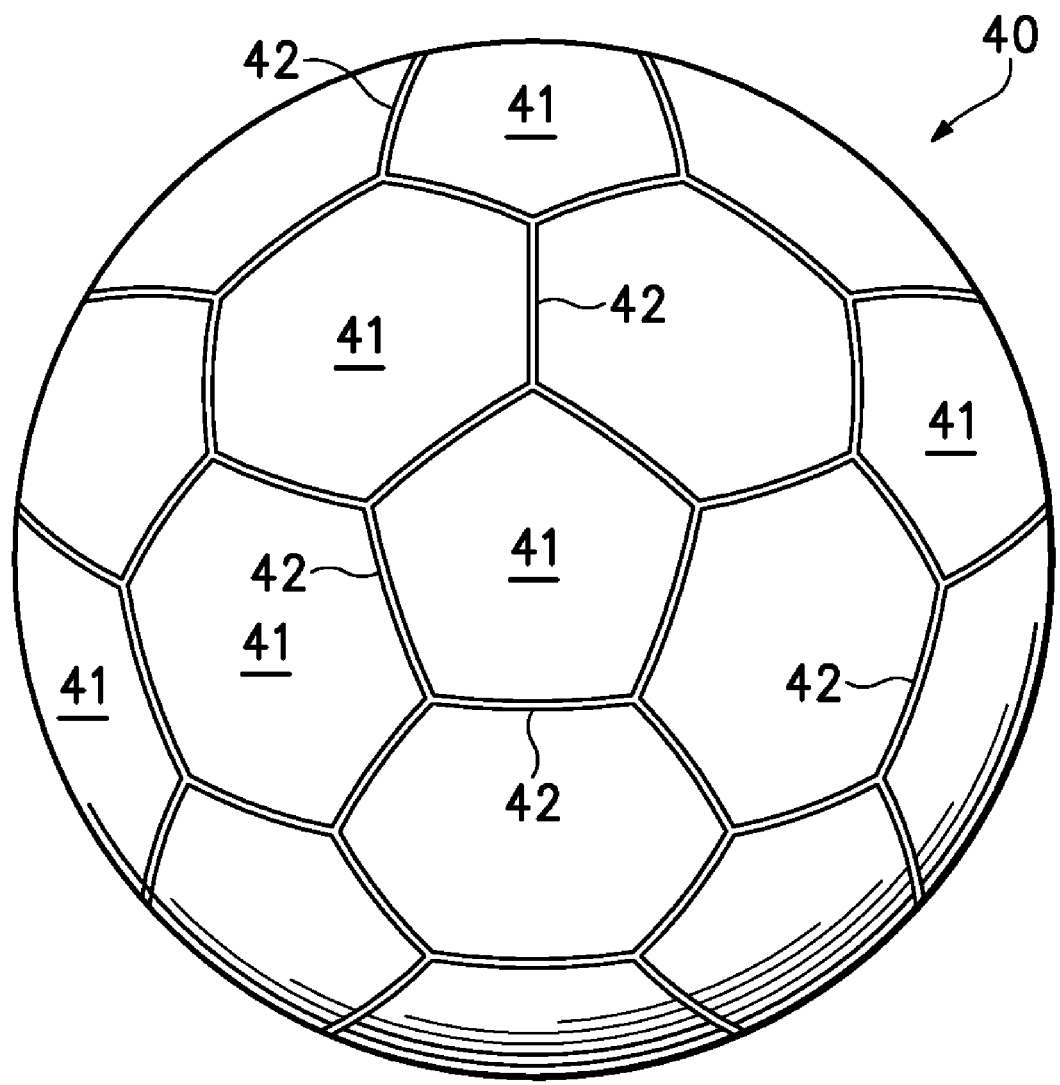
Figure 4C:
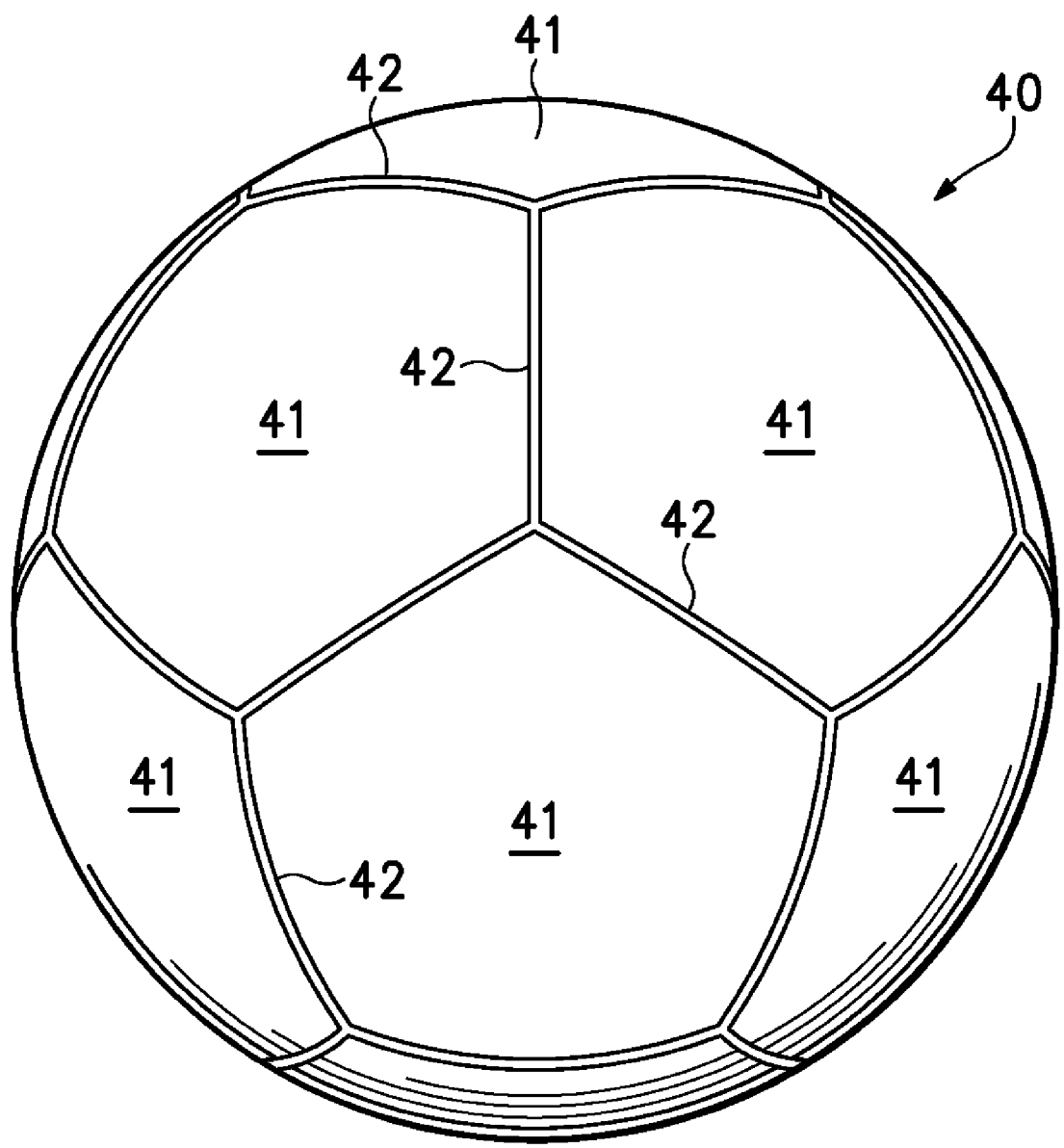
Figure 4D:
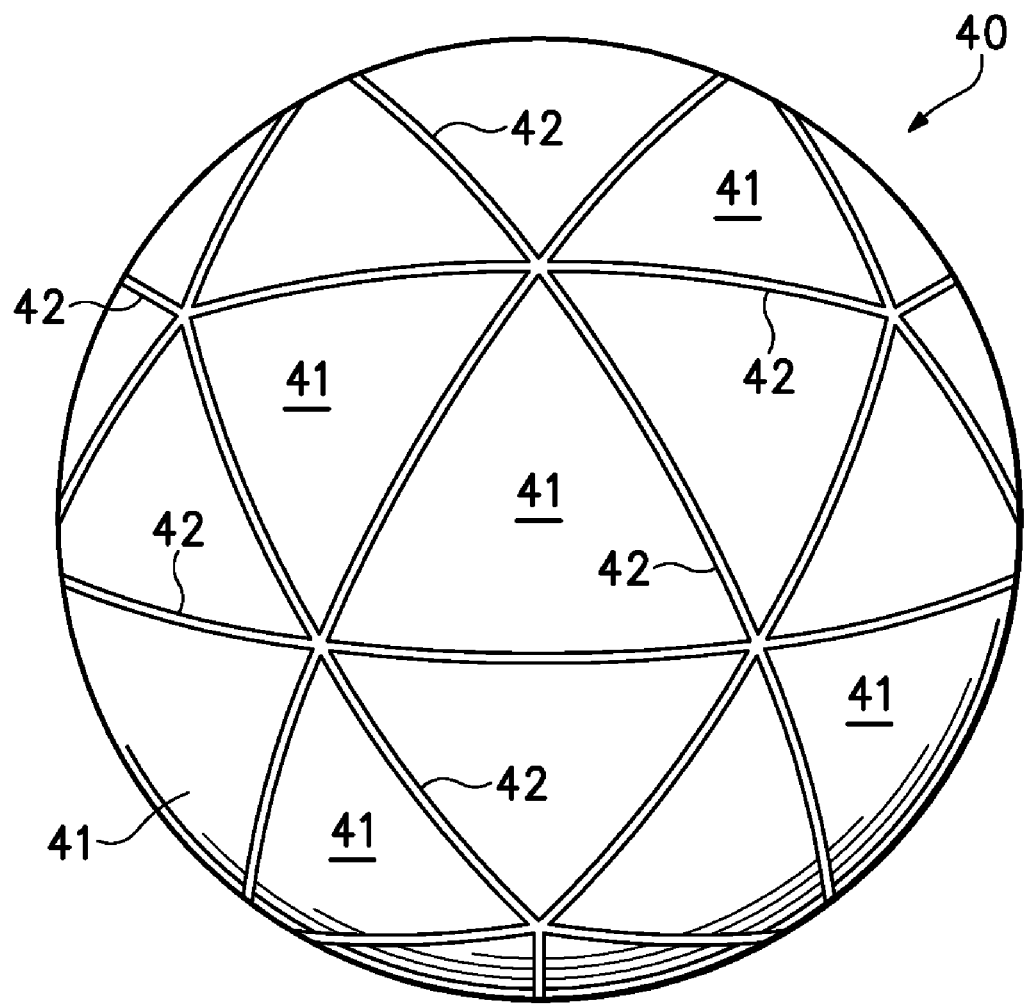
Figure 4E:
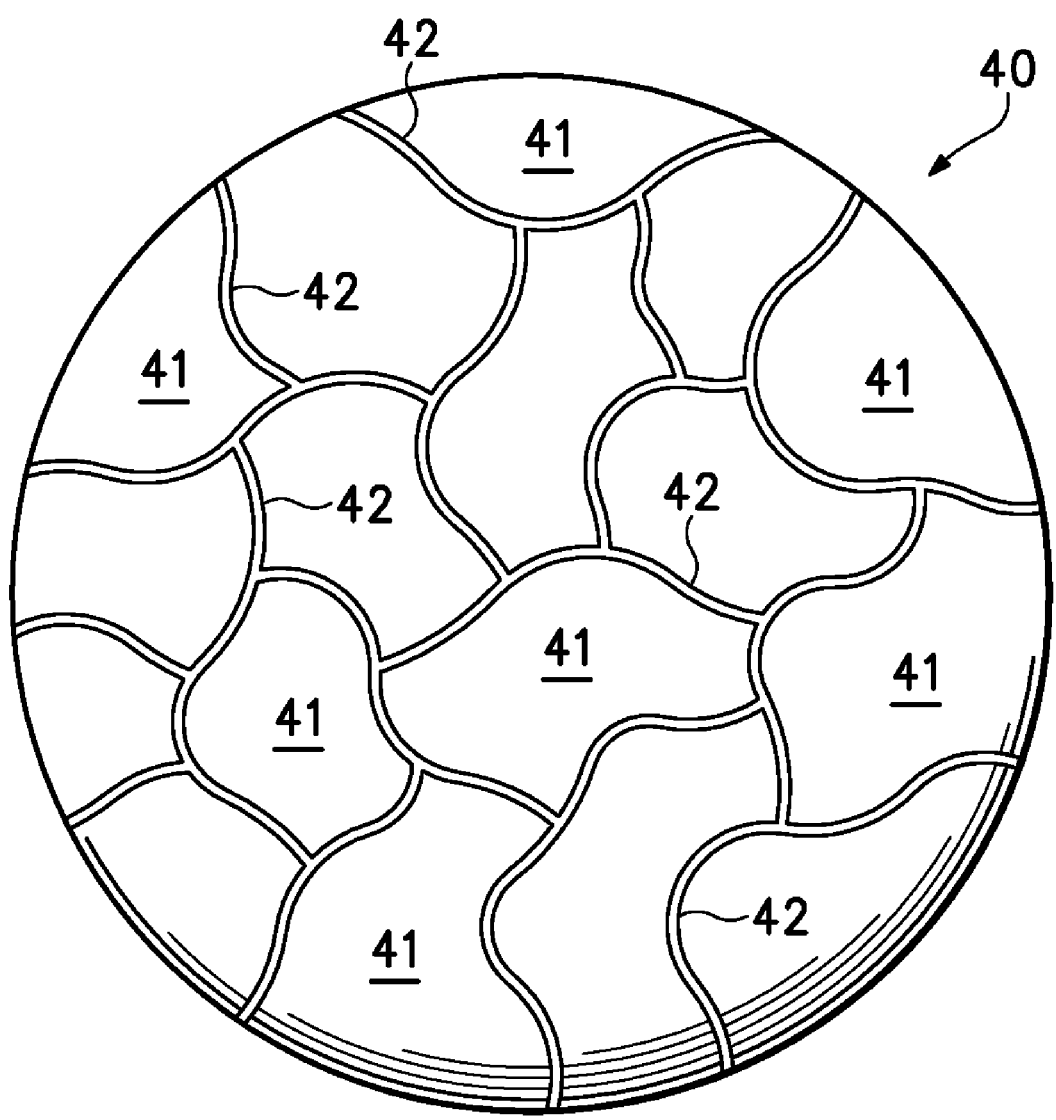
Figure 5:
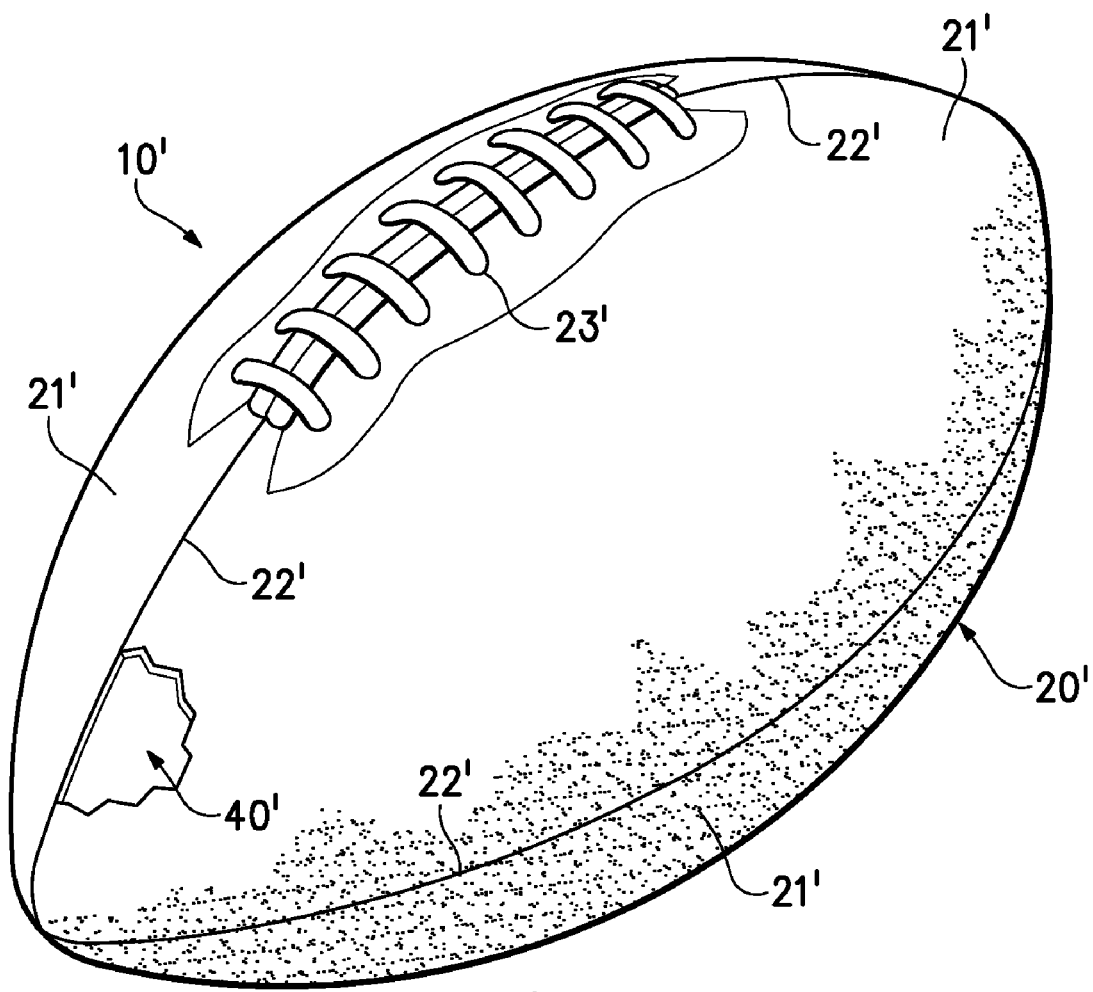
Figure 6:
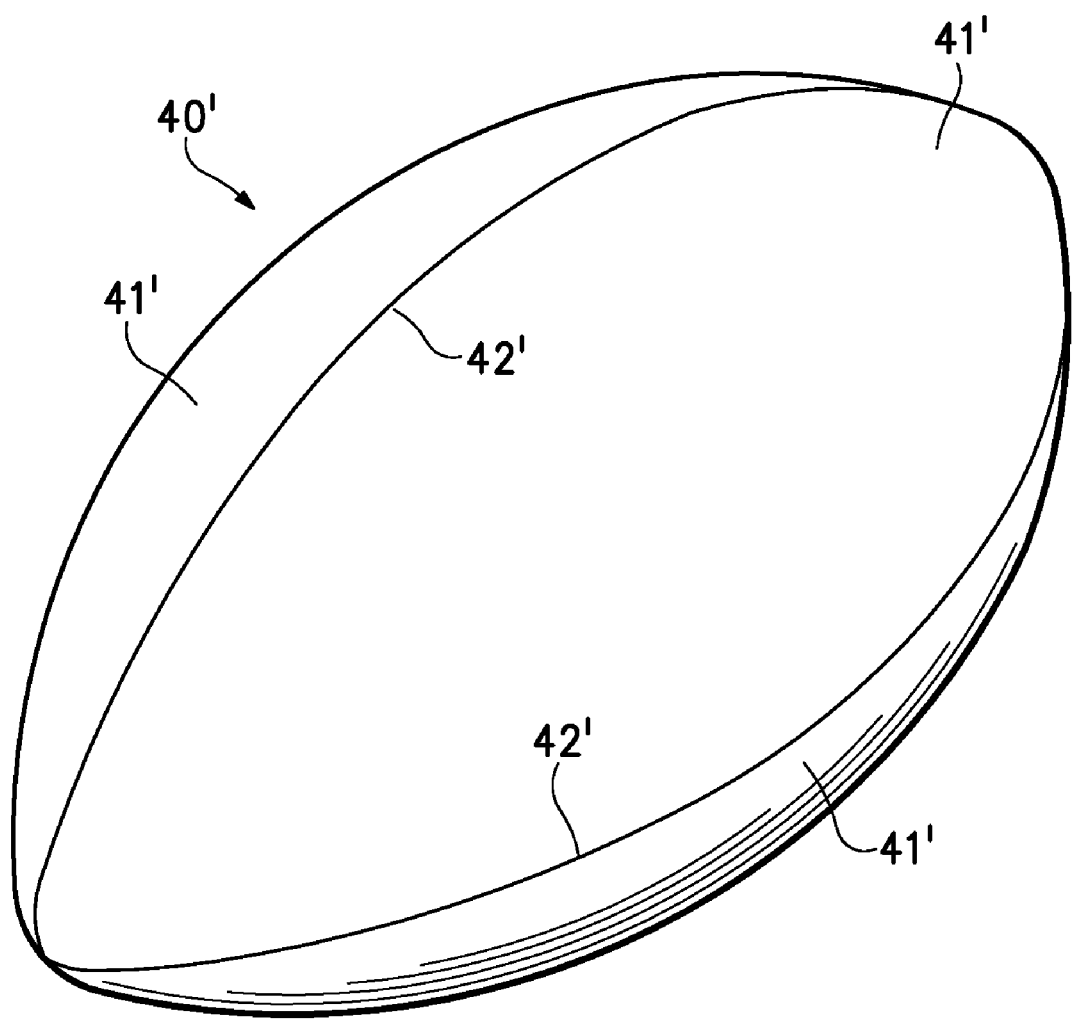
Figure 7:
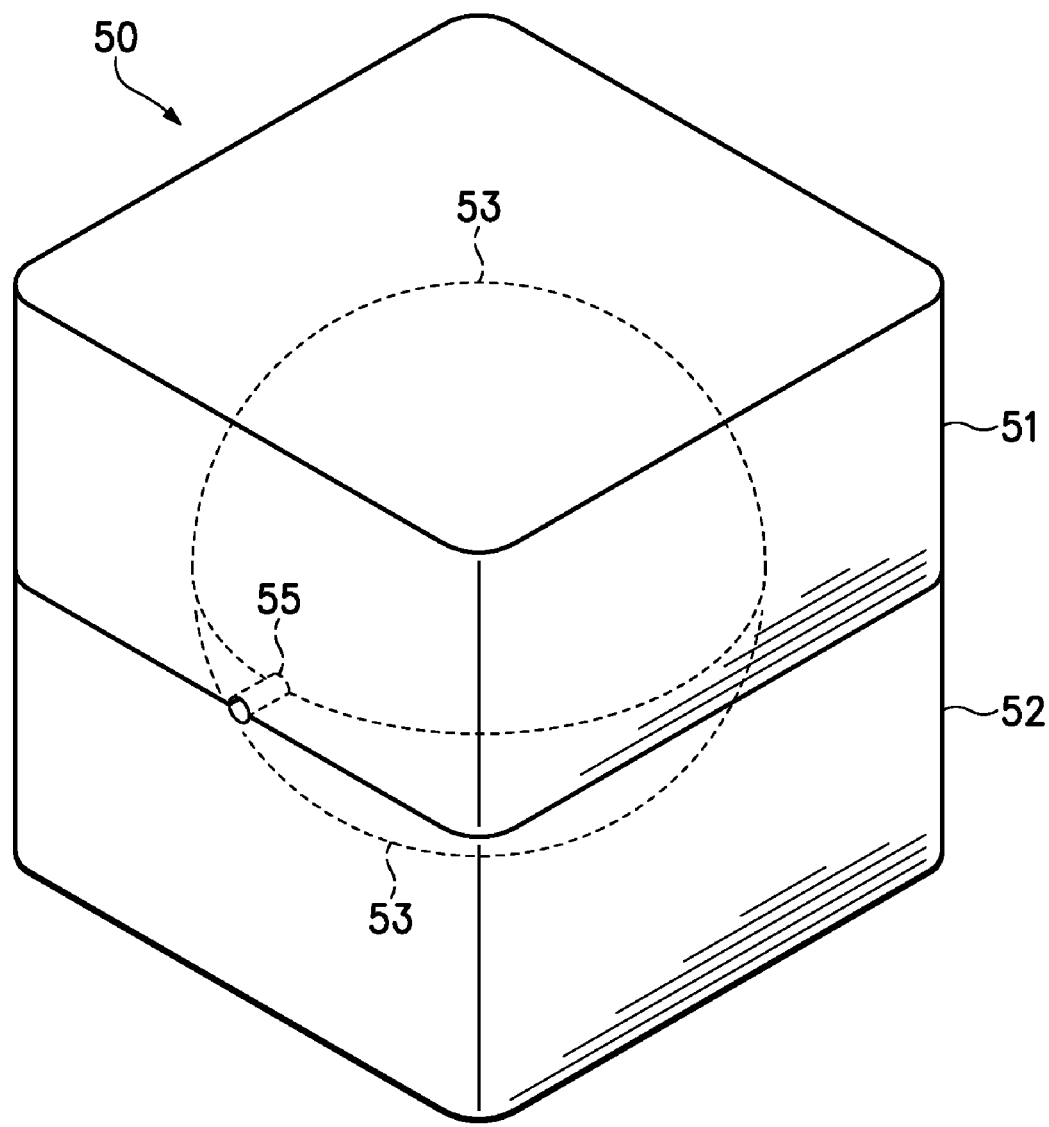
Figure 8:
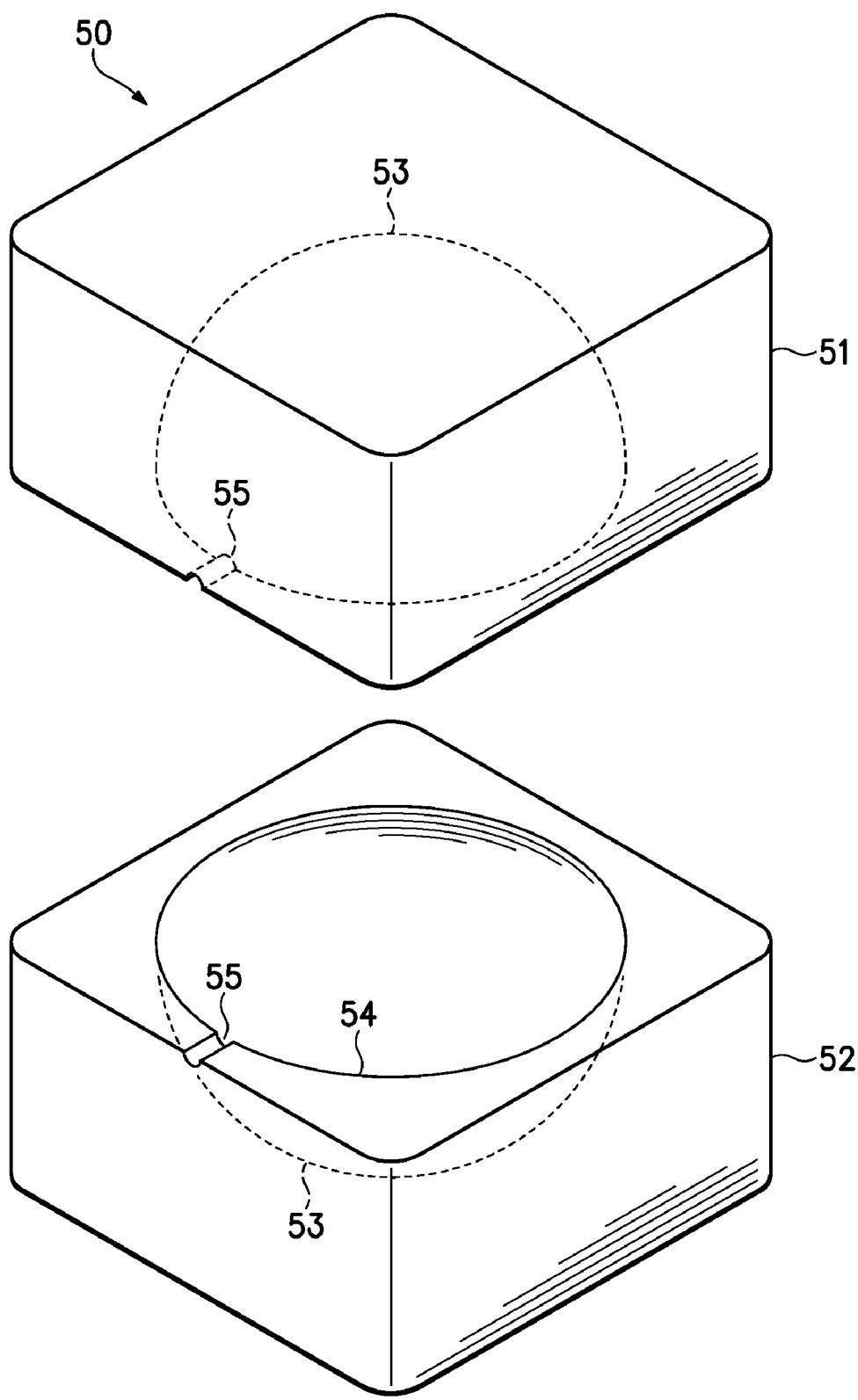
Figure 9A:
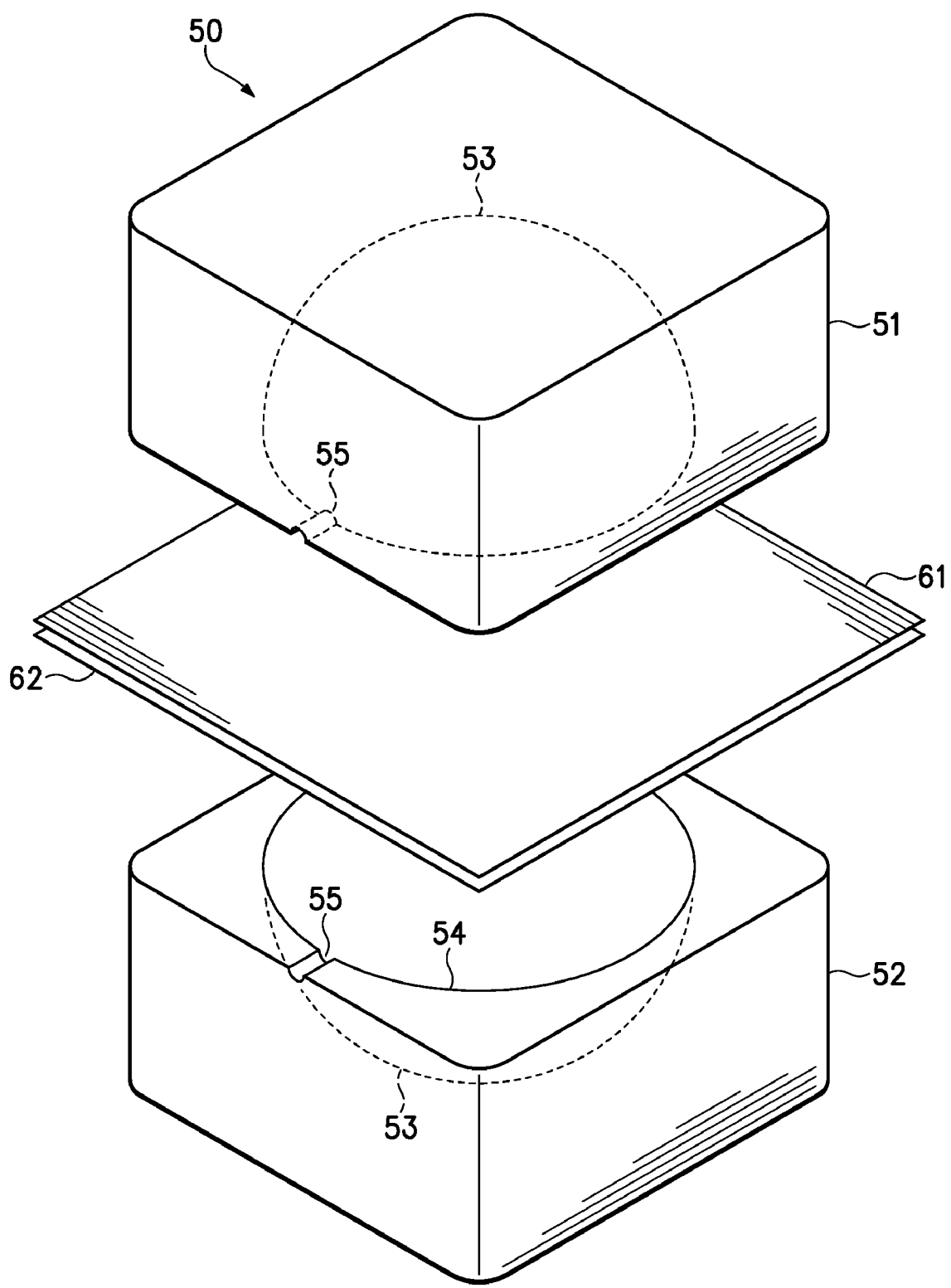
Figure 9B:
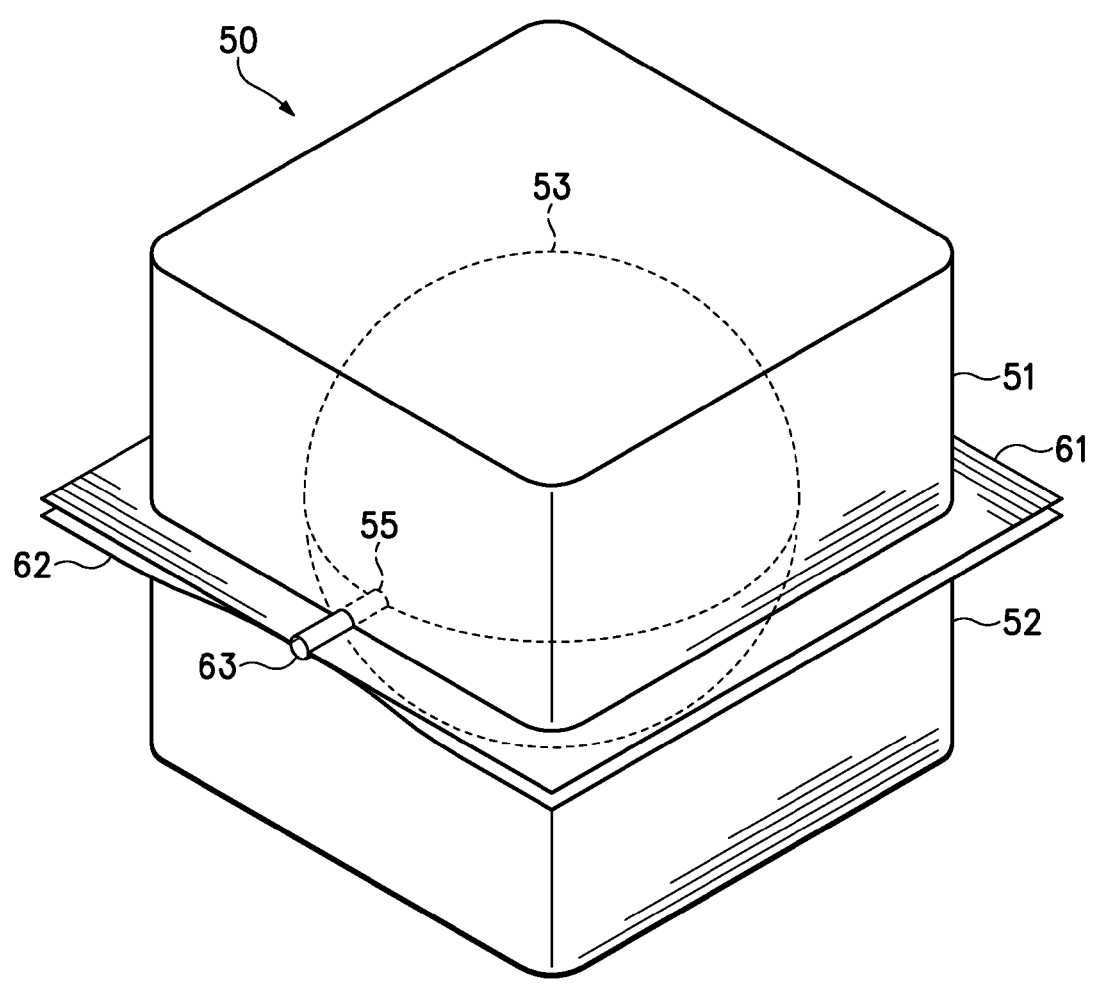
Figure 9C:
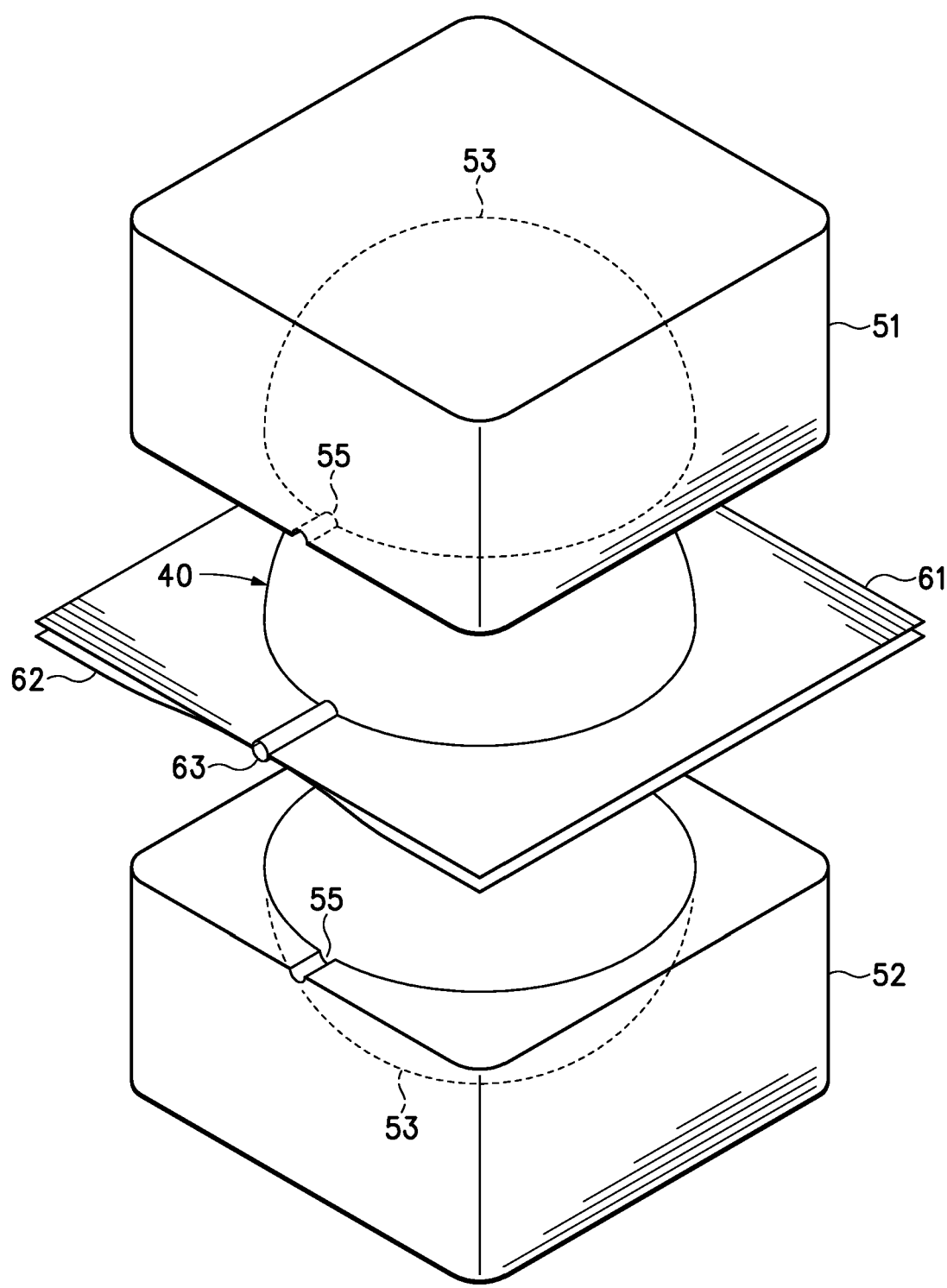

FIG. 1 is a perspective view of a sport ball.
FIG. 2 is another perspective view of the sport ball.
FIG. 3 is a perspective view of a bladder of the sport ball.
FIGS. 4A-4E are perspective views of additional configurations of the bladder.
FIG. 5 is a perspective view of another sport ball.
FIG. 6 is a perspective view of a bladder of the sport ball depicted in FIG. 5.
FIG. 7 is a perspective view of a mold for forming the bladder depicted in FIG. 3.
FIG. 8 is an exploded perspective view of the mold.
FIGS. 9A-9C are schematic perspective views of a manufacturing process for forming the bladder depicted in FIG. 3.

Figure 10:
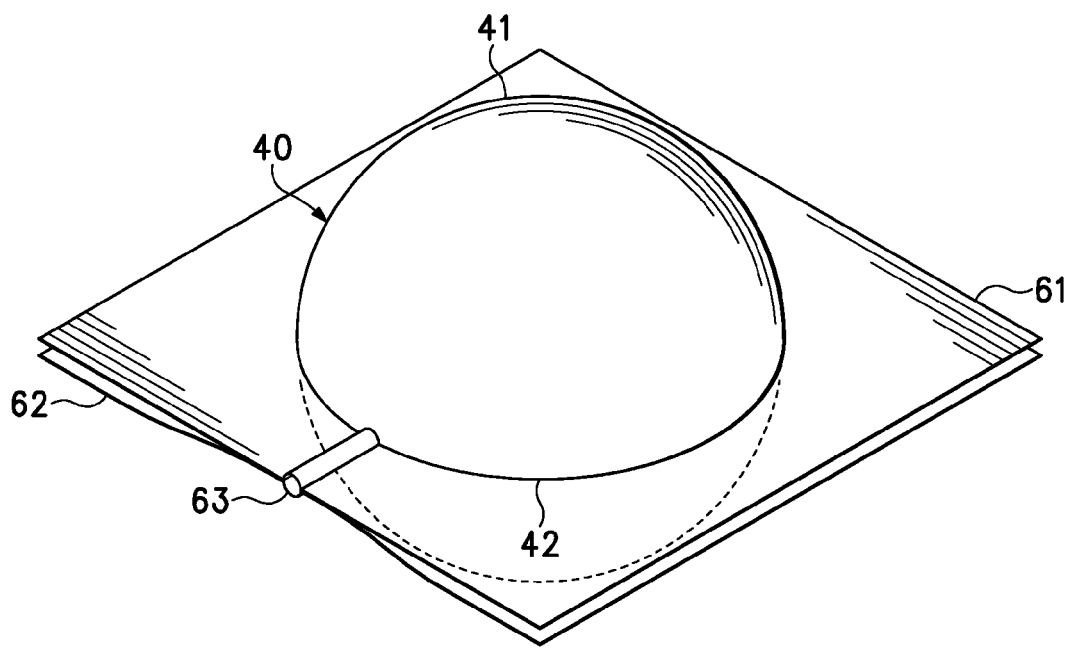
Figure 11A:
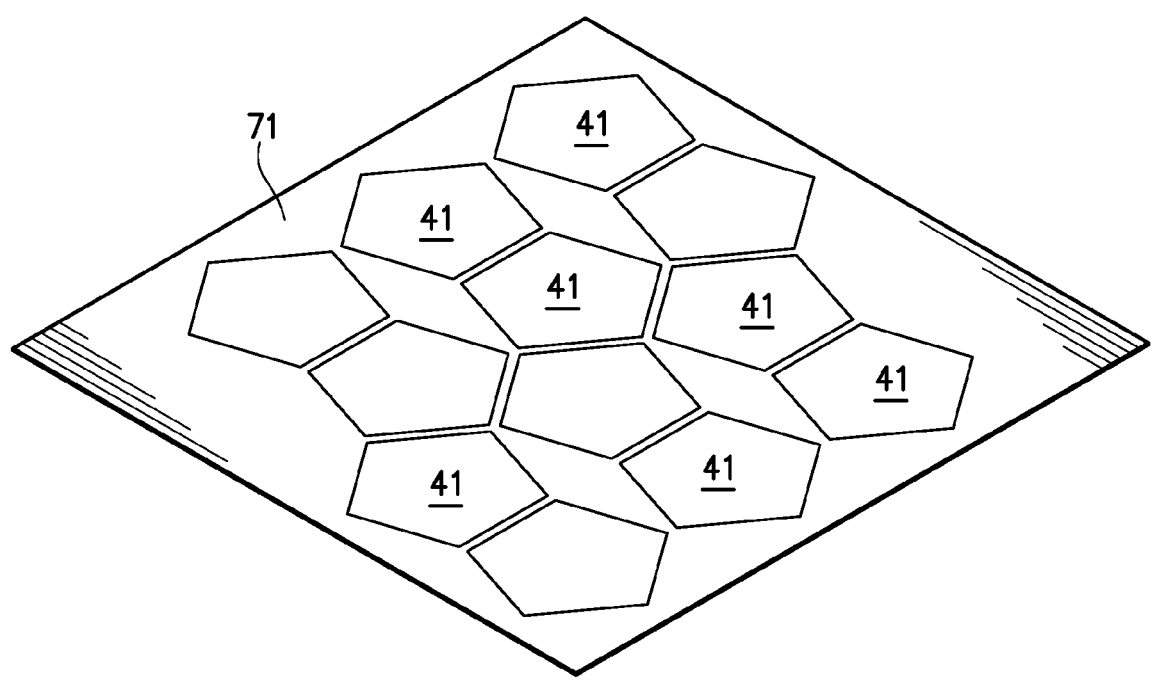
Figure 11B:
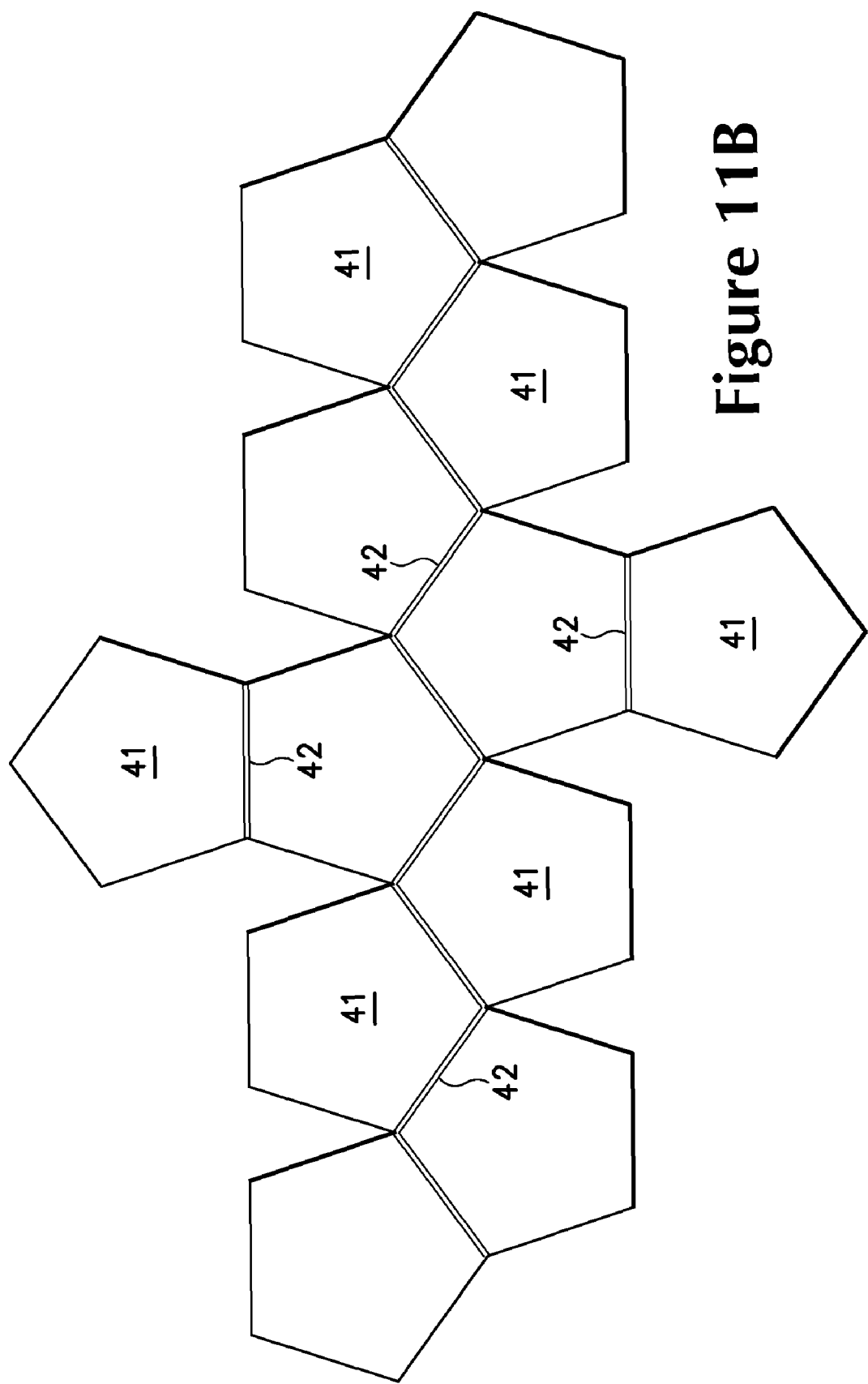
Figure 11C:
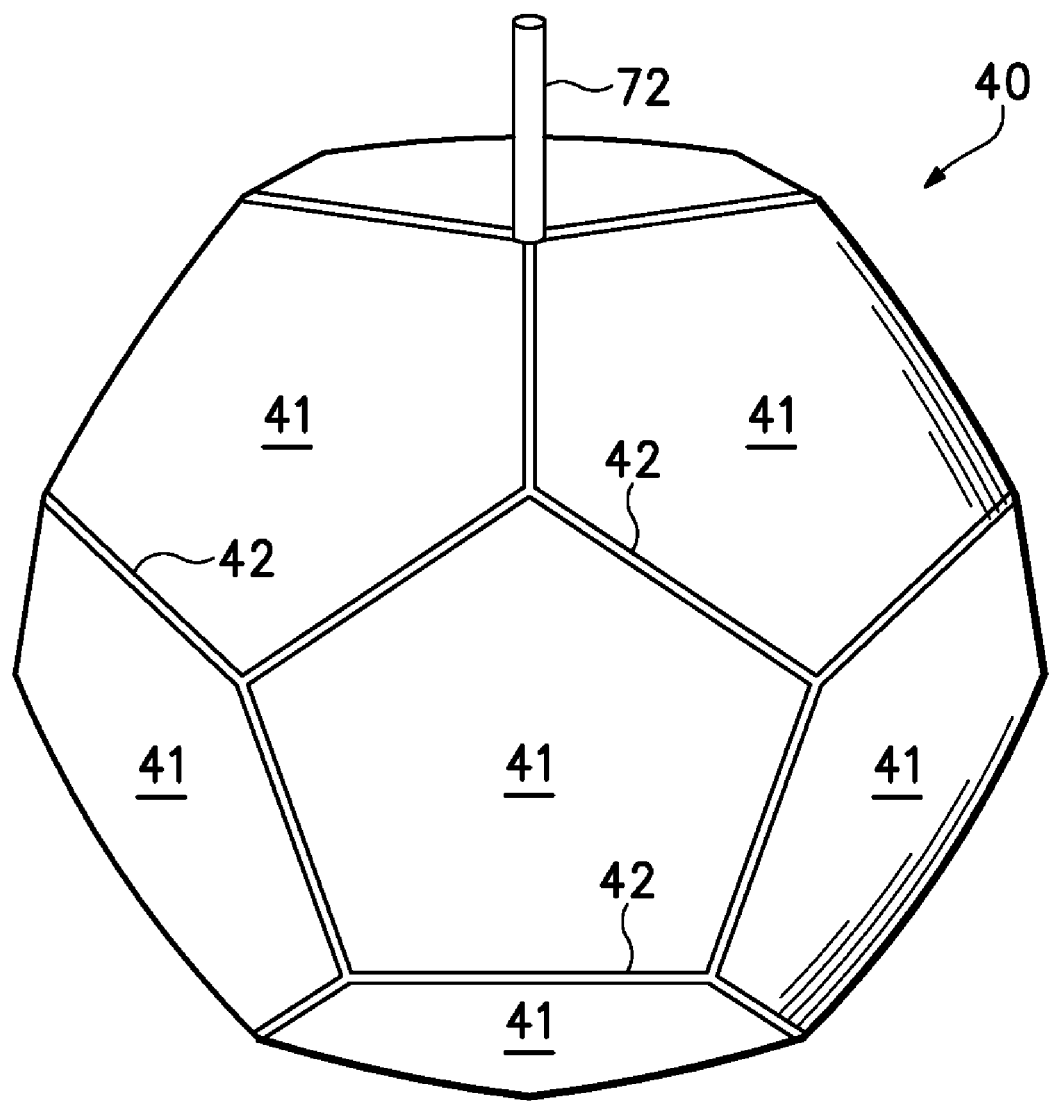
Figure 11D:
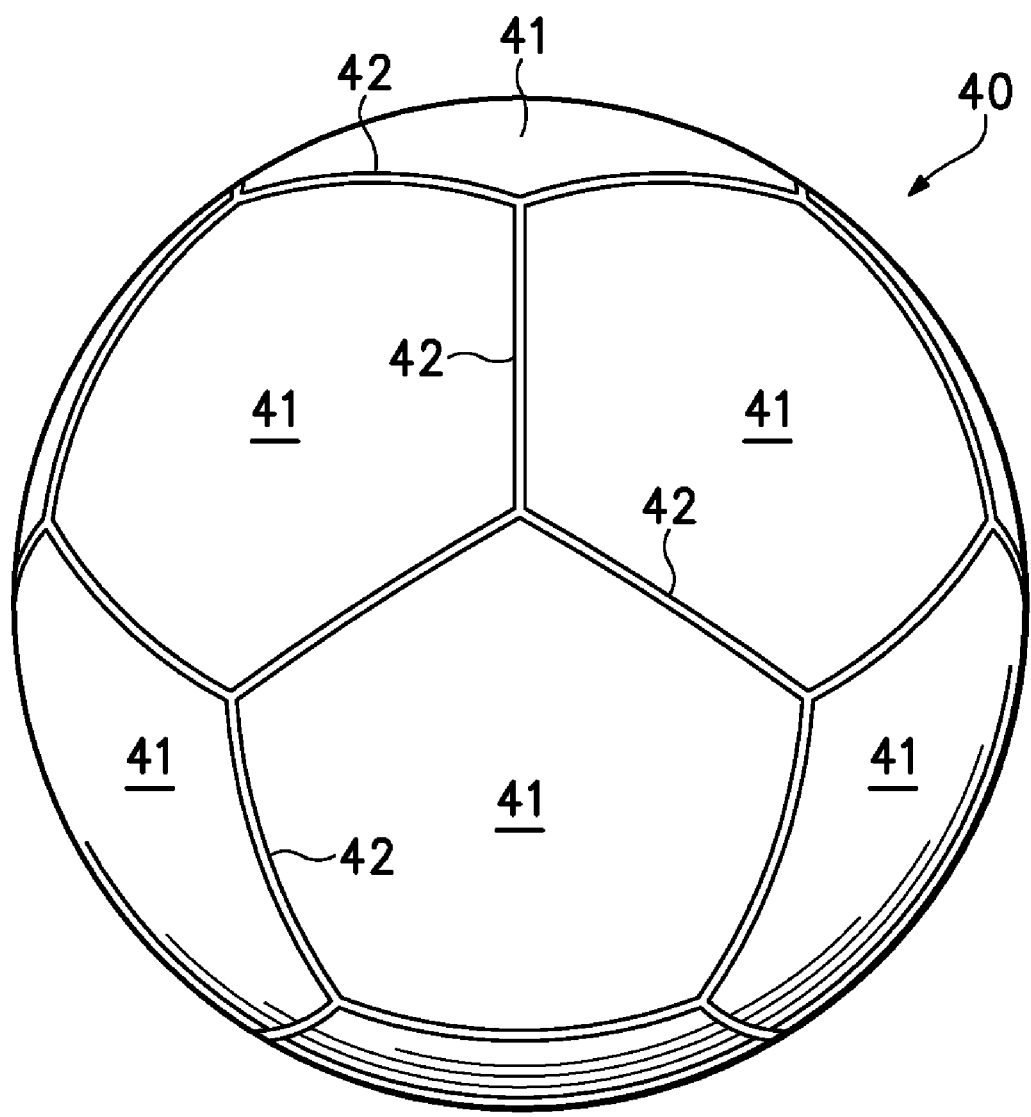
Figure 11E:
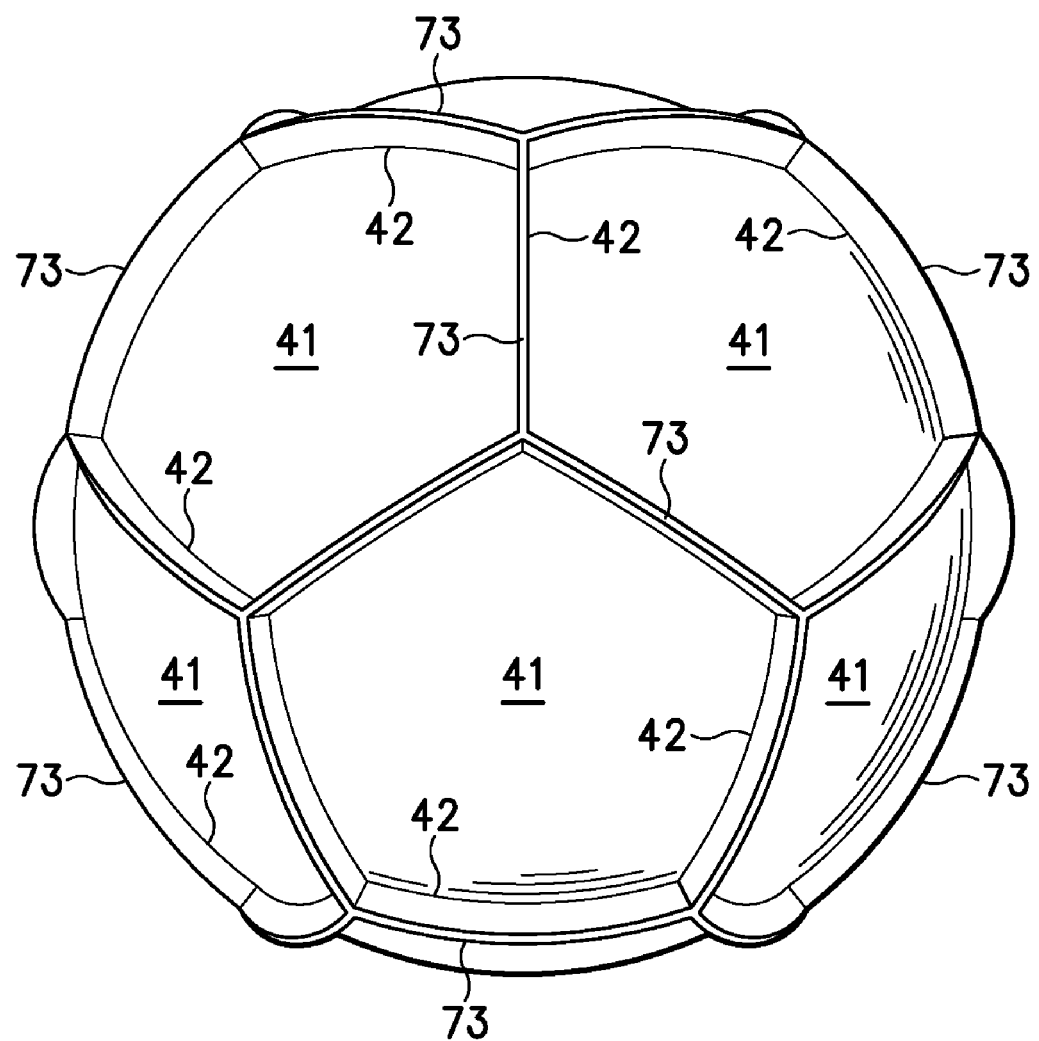
Figure 12A:
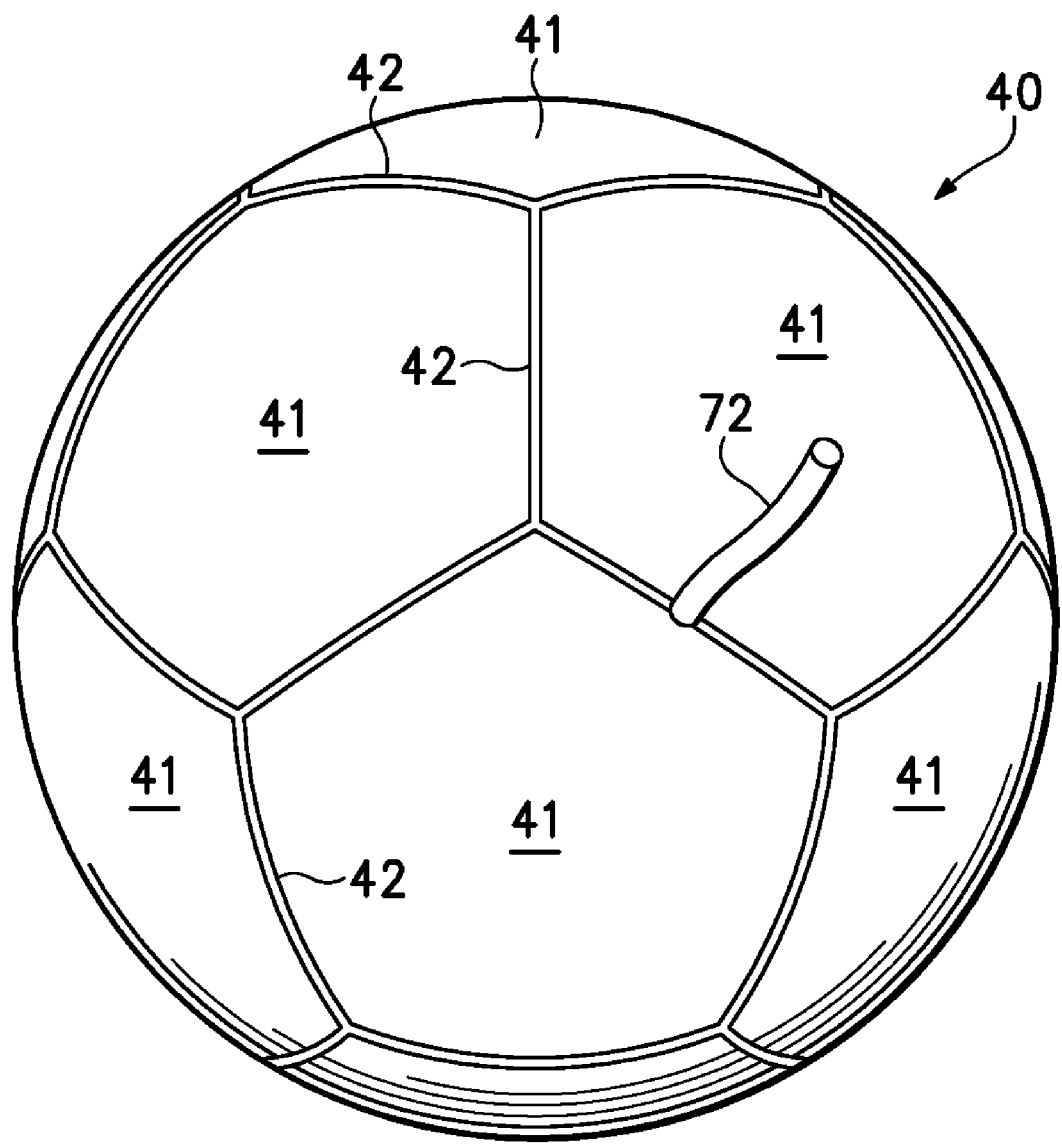
Figure 12B:
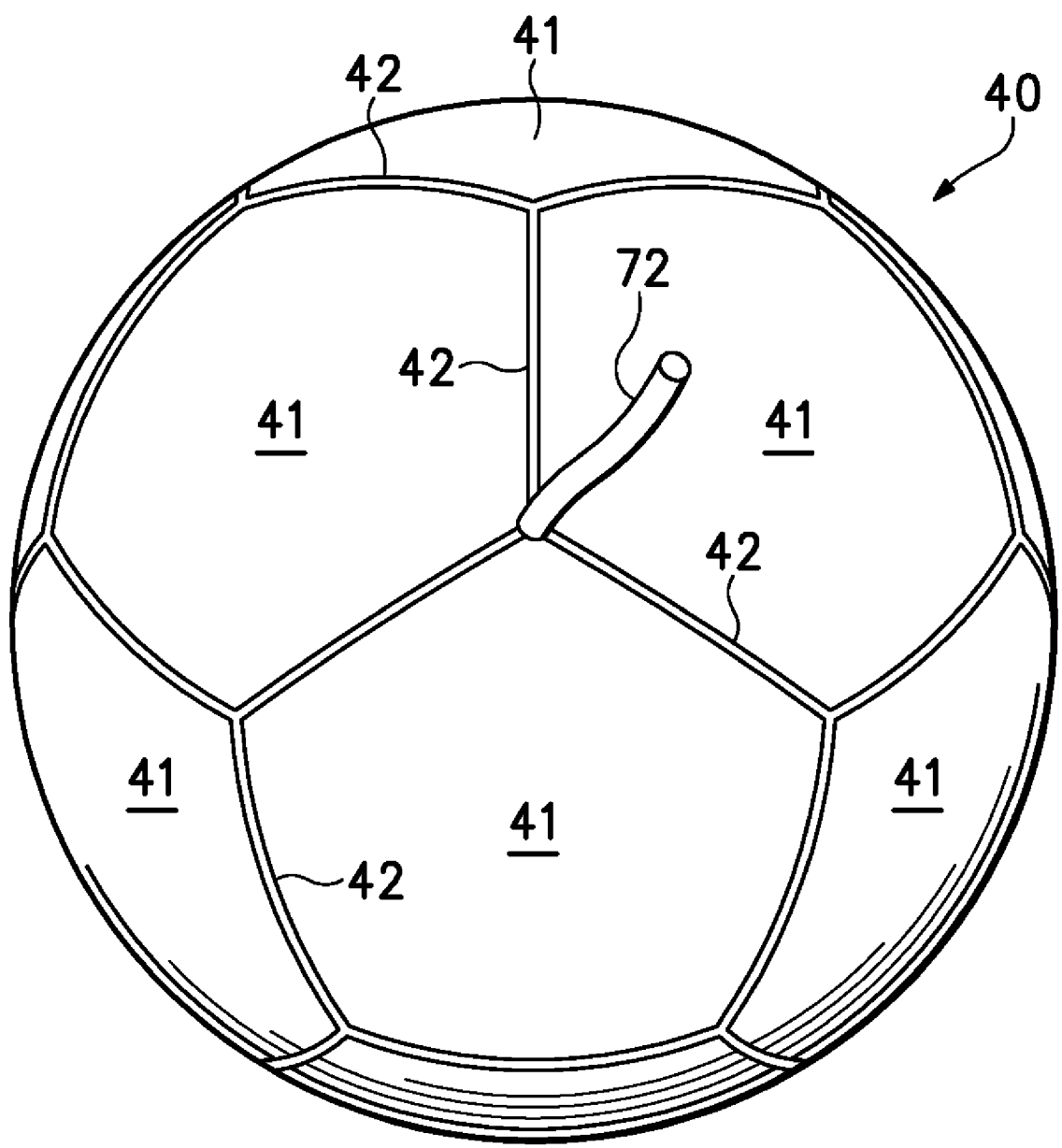
Figure 13:
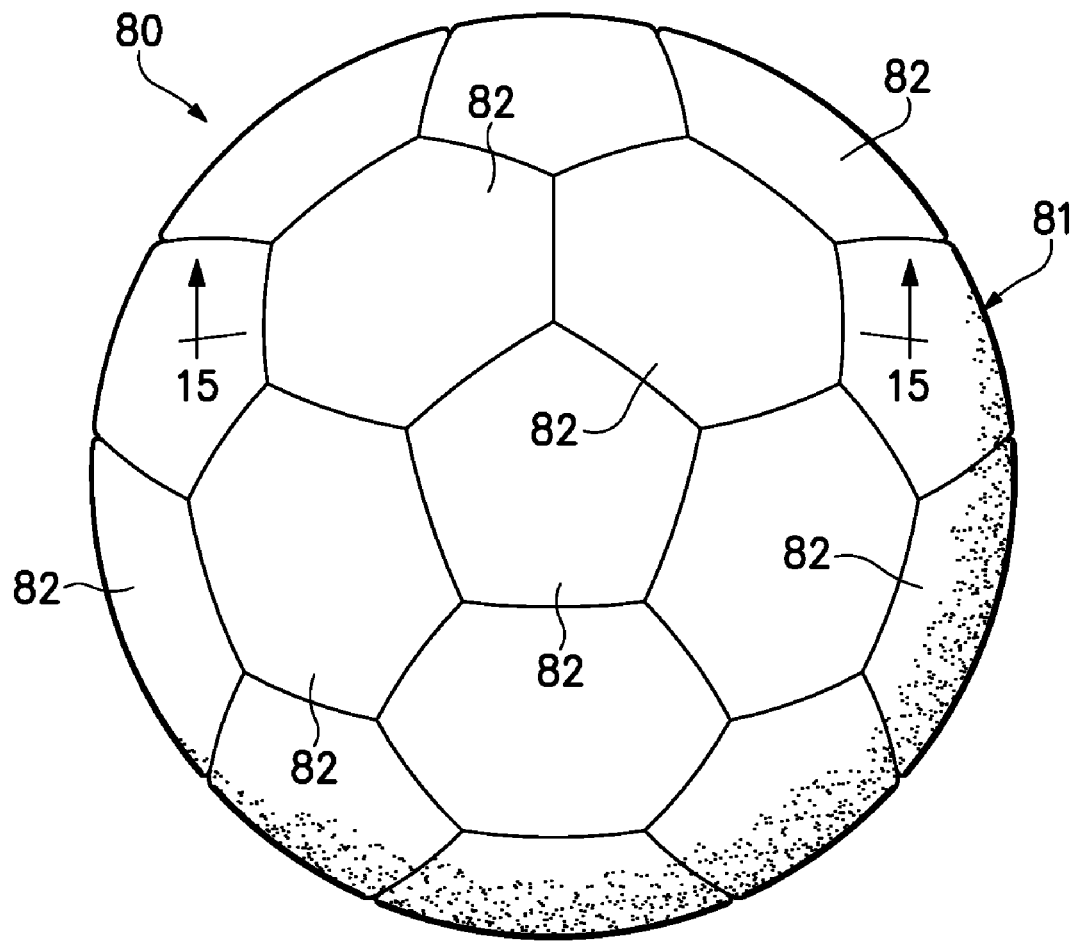
Figure 14:
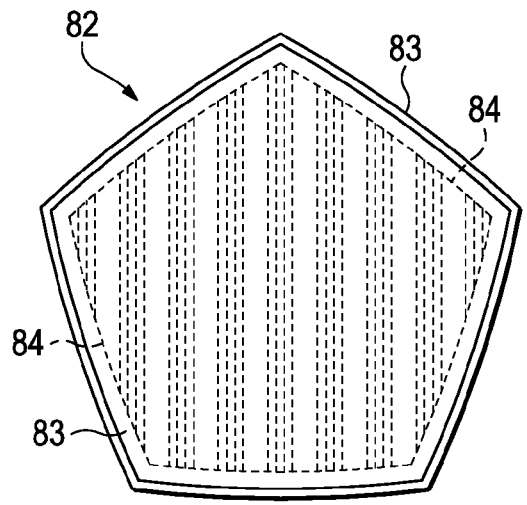
Figure 15:
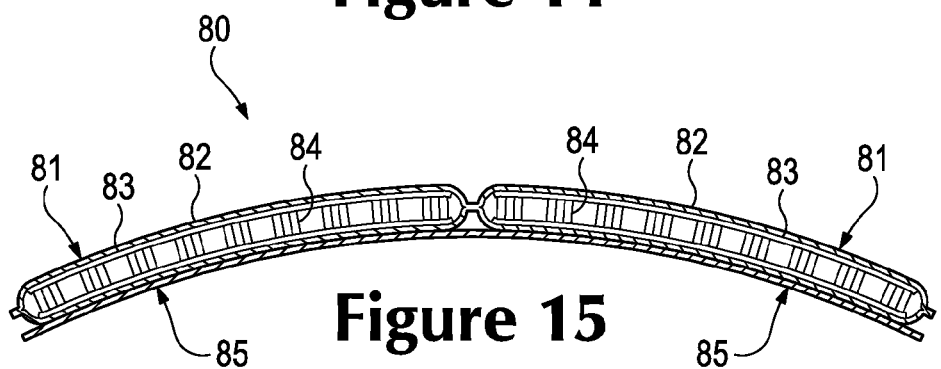
Figure 16:
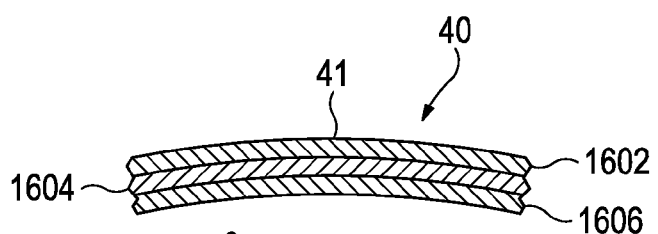
Figure 17:
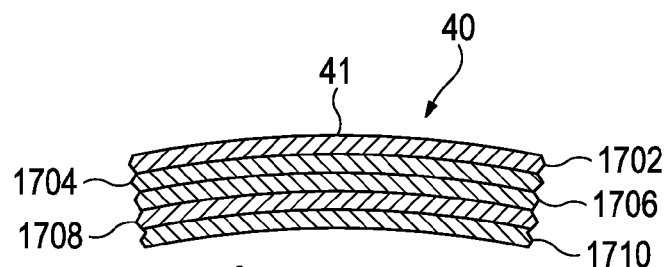

FIG. 10 is a perspective view of the bladder and residual portions of polymer sheets forming the bladder following the manufacturing process.
FIGS. 11A-11E are schematic perspective views of manufacturing processes for forming the bladder depicted in FIG. 4C.
FIGS. 12A and 12B are partial perspective views of the bladder depicted in FIG. 4C and an inflation tube.
FIG. 13 is a perspective view of another sport ball.
FIG. 14 is a top plan view of a chamber panel of the sport ball depicted in FIG. 13.
FIG. 15 is a cross-sectional view of the sport ball depicted in FIG. 13, as defined by section line 15-15.
FIG. 16 is a cross-sectional view of the bladder, as defined by section line 16-16 in FIG. 3.
FIG. 17 is a cross-sectional view of an alternative embodiment of the bladder, as defined by section line 16-16 in FIG. 3.

DETAILED DESCRIPTION

The following discussion and accompanying figures disclose various bladder configurations for a sport ball. Although the sport ball is primarily discussed and depicted in relation to a soccer ball, concepts associated with the sport ball may be applied to a variety of other types of inflatable sport balls. In addition to a soccer ball, therefore, concepts discussed herein may be incorporated into basketballs, footballs (for either American football or rugby), and volleyballs, for example.

Sport Ball Configurations

A sport ball 10 having the configuration of a soccer ball is depicted in FIGS. 1 and 2. Ball 10 has a layered structure that includes a casing 20, a intermediate layer 30, and a pressurized bladder 40. Casing 20 forms an exterior of ball 10 and is generally formed from various casing panels 21 that are stitched or otherwise joined together along abutting sides or edges to form a plurality of seams 22 on an exterior surface of ball 10. Casing panels 21 are depicted as having the shapes of equilateral hexagons and equilateral pentagons. In further configurations of ball 10, however, casing panels 21 may have non-equilateral shapes, casing panels 21 may have concave or convex edges, and selected casing panels 21 may be formed integral with adjacent casing panels 21 to form bridged panels that reduce the number of seams, for example. Casing panels 21 may also have a variety of other shapes (e.g., triangular, square, rectangular, trapezoidal, round, oval, non-geometrical) that combine in a tessellation-type manner to form casing 20, and casing panels 21 may also exhibit non-regular or non-geometrical shapes. In other configurations, casing 20 may have a seamless configuration (i.e., where seams 22 are absent). The materials selected for casing 20 may be leather, polyurethane, polyvinyl chloride, or other materials that are generally durable and wear-resistant. In some configurations, each of casing panels 21 may have a layered configuration that combines two or more materials. For example, an exterior portion of each casing panel 21 may be formed from a polyurethane layer, and an interior portion of each casing panel 21 may be formed from a polymer foam layer. Accordingly, the configuration of casing 20 may vary significantly to include a variety of configurations and materials.

Intermediate layer 30 forms a middle layer of ball 10 and is positioned between bladder 40 and casing 20. In general, intermediate layer 30 is formed from materials with a limited degree of stretch in order to restrict expansion of the bladder 40, but may have a variety of configurations or purposes. As examples, intermediate layer 30 may be formed from (a) a thread, yarn, or filament that is repeatedly wound around bladder 40 in various directions to form a mesh that covers substantially all of bladder 40; (b) a plurality of generally flat or planar textile elements stitched together to form a structure that extends around bladder 40; (c) a plurality of generally flat or planar textile strips that are impregnated with latex and placed in an overlapping configuration around bladder 40; or (d) a substantially seamless spherically-shaped textile. In some configurations of ball 10, intermediate layer 30 may also be bonded, joined, or otherwise incorporated into casing 20 as a backing material, or intermediate layer 30 may be absent from ball 10. Accordingly, the configuration of intermediate layer 30 may vary significantly to include a variety of configurations and materials.

Bladder 40 is located within intermediate layer 30 to provide an inner portion of ball 10. The pressurization of bladder 40 induces ball 10 to take on a substantially spherical shape. More particularly, pressure within bladder 40 causes bladder 40 to place an outward force upon intermediate layer 30. In turn, intermediate layer 30 places an outward force upon casing 20. In order to limit expansion of bladder 40 and also limit tension in casing 20, intermediate layer 30 is generally formed from a material that has a limited degree of stretch. In other words, bladder 40 places an outward force upon intermediate layer 30, but the stretch characteristics of intermediate layer 30 effectively prevent the outward force from inducing significant tension in casing 20. Accordingly, intermediate layer 30 restrains pressure from bladder 40, while permitting outward forces to induce a substantially spherical shape in casing 20, thereby imparting a substantially spherical shape to ball 10.

A variety of configurations are suitable for bladder 40. Referring to FIG. 3, bladder 40 is depicted as incorporating two hemispherical bladder panels 41 that are joined by a single seam 42, thereby imparting a generally spherical shape to bladder 40. Bladder panels 41 may be planar polymer elements that are joined at seam 42 and then pressurized to cause expansion and induce bladder 40 to take on the generally spherical shape. Additionally, bladder panels 41 may be polymer elements that are thermoformed to impart a rounded or hemispherical configuration, joined at seam 42, and then pressurized to induce bladder 40 to take on the generally spherical shape. Accordingly, bladder panels 41 may be planar polymer elements or rounded polymer elements when incorporated into bladder 40.

Although bladder 40 may be formed from two hemispherical bladder panels 41, bladder 40 may also have a variety of other configurations. Referring to FIG. 4A, bladder 40 is formed from a pair of bladder panels 41 joined at a seam 42 that impart a general configuration of a seam in a tennis ball or baseball. Bladder 40 may also be formed from a plurality of bladder panels 41 that have hexagonal and pentagonal shapes, as depicted in FIG. 4B, thereby having a configuration that is similar to casing 20. In other configurations, all of bladder panels 41 may all have pentagonal shapes, as depicted in FIG. 4C, or bladder panels 41 may all have triangular shapes, as depicted in FIG. 4D. Bladder panels 41 may also have non-geometrical or non-regular shapes, as depicted in FIG. 4E. Accordingly, the configurations of bladder panels 41 utilized in bladder 40 may vary significantly.

Unlike many conventional bladders for sport balls, bladder 40 has a sealed and valveless structure. That is, a polymer material forming bladder 40 is sealed to substantially prevent a gas located within bladder 40 from escaping to an exterior of ball 10, although some diffusion through the polymer material of bladder panels 41 may occur. Moreover, bladder 40 does not incorporate a valve that permits a gas to be injected into bladder 40 or removed from bladder 40, thereby providing the valveless structure. Accordingly, bladder 40 may be pressurized during the manufacturing process and will remain pressurized for the useful life of ball 10.

A wide range of polymer materials may be utilized for bladder 40. In selecting materials for bladder 40, engineering properties of the material (e.g., tensile strength, stretch properties, fatigue characteristics, dynamic modulus, and loss tangent) as well as the ability of the material to prevent the diffusion of the fluid contained by bladder 40 may be considered. As described in greater detail below, bladder panels 41 are bonded together at seams 42. Although adhesives may be utilized to form seams 42, heat bonding or radio frequency bonding may be utilized when bladder panels 41 are formed from a thermoplastic material. As example of a suitable thermoplastic material is thermoplastic polyurethane. Given that ball 10 may be utilized in damp or humid conditions and an interior of ball 10 may be exposed to water, an ether-based thermoplastic polyurethane that is resistant to fungus may be advantageous.

In addition to thermoplastic polyurethane, examples of polymer materials that may be suitable for bladder 40 include urethane, polyester, polyester polyurethane, and polyether polyurethane. Bladder 40 may also be formed from a material that includes alternating layers of thermoplastic polyurethane 1602 and 1606 and ethylene-vinyl alcohol copolymer 1604, as depicted in FIG. 16 and disclosed in U.S. Pat. Nos. 5,713,141 and 5,952,065 to Mitchell, et al. A variation upon this material may also be utilized, wherein a center layer 1706 is formed of ethylene-vinyl alcohol copolymer, layers 1704 and 1708 adjacent to the center layer 1706 are formed of thermoplastic polyurethane, and outer layers 1702 and 1710 are formed of a regrind material of thermoplastic polyurethane and ethylene-vinyl alcohol copolymer. This alternative embodiment is shown in FIG. 17. Another suitable material for chamber 40 is a flexible microlayer membrane that includes alternating layers of a gas barrier material and an elastomeric material, as disclosed in U.S. Pat. Nos. 6,082,025 and 6,127,026 to Bonk, et al. Additional suitable materials are disclosed in U.S. Pat. Nos. 4,183,156 and 4,219,945 to Rudy. Further suitable materials include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340; 6,203,868; and 6,321,465 to Bonk, et al.

Bladder 40 may enclose a fluid pressurized between zero and three-hundred-fifty kilopascals (i.e., approximately fifty-one pounds per square inch) or more. In addition to air and nitrogen, the fluid contained by bladder 40 may include octafluorapropane or be any of the gasses disclosed in U.S. Pat. No. 4,340,626 to Rudy, such as hexafluoroethane and sulfur hexafluoride, for example. Although discussed above as having a sealed and valveless configuration, some configurations of bladder 40 may incorporate a valve that permits adjustments to the pressure of the fluid.

Although ball 10 may have the configuration of a soccer ball, concepts associated with ball 10 may be incorporated into other types of sport balls. Referring to FIG. 5, a sport ball 10' is depicted as having the configuration of a football. A casing 20' forms an exterior of ball 10' and is formed from various panels 21' that are joined by seams 22'. Laces 23' also extend along one of seams 22'. A bladder 40', which is depicted individually in FIG. 6, is located within casing 20' and formed from various bladder panels 41' that are joined at seams 42'. Whereas ball 10 and bladder 40 each have generally spherical shapes, ball 10' and bladder 40' each have an oblong shape that is characteristic of a football. In addition to soccer balls and footballs, concepts associated with balls 10 and 10' may be incorporated into basketballs, footballs for rugby, and volleyballs, for example.

Casing 20 is depicted in FIGS. 1 and 2 as having various pentagonal and hexagonal casing panels 21. Similarly, bladder 40 is depicted in FIG. 4B as having various pentagonal and hexagonal bladder panels 41. In this configuration, the number and shapes of bladder panels 41 may be the same as the number and shapes of casing panels 21. When located within casing 20, seams 42 of bladder 40 may align with seams 22 of casing 20. In other configurations, casing 20 may be formed from only pentagonal casing panels 21. Similarly, bladder 40 is depicted in FIG. 4C as having various pentagonal bladder panels 41. In this configuration also, the number and shapes of bladder panels 41 may be the same as the number and shapes of casing panels 21. In general, seams 22 form areas of casing 20 that are thicker than central areas of casing panels 21 (i.e., areas that are spaced from seams 22). Also, seams 42 may form indentations in the surface of bladder 40. By aligning the thicker seams 22 with the indentations of seams 42, the sphericity of ball 10 may be enhanced. That is, selecting the number and shapes of bladder panels 41 to be the same as the number and shapes of casing panels 21 may have an advantage of increasing the overall sphericity of ball 10.

Thermoforming Manufacturing Process

A variety of manufacturing processes may be utilized for the various configurations of bladder 40 depicted in FIGS. 3 and 4A-4E. As an example, a thermoforming process may form bladder 40 from a pair of polymer sheets that are molded to form bladder panels 41 and bonded to seal bladder 40 and define seam 42. More particularly, the thermoforming process (a) imparts shape to one of the polymer sheets in order to form a hemispherical or otherwise curved structure of one of bladder panels 41, (b) imparts shape to another of the polymer sheets in order to form a hemispherical or otherwise curved structure of the other of bladder panels 41, and (c) forms seam 42 by bonding peripheries of the curved structures formed from the polymer sheets. The thermoforming process may also involve sealing bladder 40 or incorporating an inflation tube that permits bladder 40 to be pressurized.

Utilizing the configuration of bladder 40 depicted in FIG. 3, a mold 50 having an upper mold portion 51 and a lower mold portion 52 may be formed to have the configuration depicted in FIGS. 7 and 8. Each of mold portions 51 and 52 cooperatively define an internal cavity 53 with the configuration of bladder 40. When mold portions 51 and 52 are joined together, therefore, cavity 53 has a generally spherical shape with the approximate dimensions of bladder 40. Depending upon the degree to which the pressurization of bladder 40 induces the polymer material to stretch, cavity 53 may exhibit lesser volume or a lesser diameter than bladder 40 in the pressurized state.

The manner in which mold 50 is utilized to form chamber 40 from a pair of polymer sheets 61 and 62 will now be discussed in greater detail. Initially, various conductive or radiative heaters may be utilized to heat sheets 61 and 62. At elevated temperatures that depend upon the specific polymer material utilized, sheets 61 and 62 soften or become more deformable, which facilitates shaping and bonding. Once heated, sheets 61 and 62 are positioned between mold portions 51 and 52, as depicted in FIG. 9A. In some manufacturing processes, a plurality of conduits may extend through mold 50 in order to channel a heated liquid, such as water or oil, through mold 50, thereby raising the overall temperature of mold 50. When sheets 61 and 62 are positioned within mold 50, heat may be transferred from mold 50 to sheets 61 and 62 in order to raise the temperature of sheets 61 and 62. The temperature of mold 50 may vary depending upon the specific materials utilized for sheets 61 and 62.

Sheets 61 and 62 respectively form bladder panels 41, which are effectively the two hemispheres of bladder 40. In addition, sheets 61 and 62 each form portions of seam 42. The thickness of sheets 61 and 62 prior to molding may be greater than the thickness of the polymer material forming bladder 40. The rationale for the difference in thickness between sheets 61 and 62 and bladder 40 is that sheets 61 and 62 may stretch during the thermoforming process. That is, the thickness differences compensate for thinning in sheets 61 and 62 that occurs when sheets 61 and 62 are stretched or otherwise deformed during the formation of bladder 40. In order to ensure that sheets 61 and 62 stretch evenly and have a constant thickness, a plug assist system may be utilized to pre-stretch sheets 61 and 62. That is, sheets 61 and 62 may be pre-stretched through a mechanical system to ensure that sheets 61 and 62 stretch evenly and have a substantially constant thickness.

Once sheets 61 and 62 are positioned between mold portions 51 and 52, mold portions 51 and 52 translate toward each other such that sheets 61 and 62 enter cavity 63 and are shaped and bonded, as depicted in FIG. 9B. As mold 50 contacts and compresses portions of sheets 61 and 62, a fluid, such as air, having a positive pressure in comparison with ambient air may be injected between sheets 61 and 62 to induce sheets 61 and 62 to respectively contact and conform to the contours of mold portions 51 and 52. Air may also be removed from the area between sheets 61 and 62 and mold portions 51 and 52 through various vents, thereby drawing sheets 61 and 62 onto the surfaces of mold portions 51 and 52. That is, at least a partial vacuum may be formed between sheets 61 and 62 and the surfaces of mold 50. As the area between sheets 61 and 62 is pressurized and air is removed from the area between mold 50 and sheets 61 and 62, sheets 61 and 62 conform to the shape of cavity 53. More specifically, sheets 61 and 62 stretch, bend, or otherwise conform to extend along the surfaces of cavities 53 and form the general shape of bladder 40. In addition to shaping sheets 61 and 62, mold portions 51 and 52 compress sheets 61 and 62 together at locations corresponding with seam 42. More particularly, a ridge 54 extending around cavity 63 may compress sheets 61 and 62 together and form seam 42.

Once bladder 40 is formed within mold 50, mold portions 51 and 52 separate such that bladder 40 and peripheral portions of sheets 61 and 62 may be removed from mold 50, as depicted in FIGS. 9C and 10. Bladder 40 is then permitted to cool, and a pressurized fluid may be injected into an interior of bladder 40. Referring to FIGS. 7 and 8, mold portions 51 and 52 are depicted as each including a channel 55 extending from areas forming cavity 53. During the thermoforming process discussed above, channels 55 form a conduit 63 that leads to bladder 40 at seam 42. Conduit 63 may be utilized to inject the pressurized fluid, and conduit 63 may then be sealed at a position that corresponds with seam 42 to seal chamber 40. In addition, excess portions of sheets 61 and 62 may be trimmed or otherwise removed from bladder 40. The excess portions may then be recycled or reutilized to form additional sheets for other bladders 40.

Further Manufacturing Processes

Although the thermoforming process discussed above is a suitable manner of forming bladder 40, a blowmolding process may also be utilized. In general, a suitable blowmolding process involves positioning a parison between a pair of mold portions, such as mold portions 51 and 52. The parison is a generally hollow and tubular structure of molten polymer material. In forming the parison, the molten polymer material is extruded from a die. The wall thickness of the parison may be substantially constant, or may vary around the perimeter of the parison. Accordingly, a cross-sectional view of the parison may exhibit areas of differing wall thickness. Suitable materials for the parison include many of the materials discussed above with respect to bladder 40. Following placement of the parison between the mold portions, the mold portions close upon the parison and pressurized air within the parison induces the liquefied elastomeric material to contact the surfaces of the mold. In addition, closing of the mold portions and the introduction of pressurized air induces the liquefied elastomeric material to contact the surfaces of the mold portions. Air may also be evacuated from the area between the parison and the mold portions to further facilitate molding and bonding. Accordingly, bladder 40 may also be formed through a blowmolding process. As a further alternative, a conventional rotational molding process may be utilized for form bladder 40.

In addition to the thermoforming and blowmolding manufacturing processes discussed above, the various bladder panels 41 (i.e., abutting edges of bladder panels 41) may be joined through heat bonding or radio frequency bonding processes. For purposes of example in demonstrating this manufacturing process, the configuration of bladder 40 depicted in FIG. 4C will be utilized. Referring to FIG. 11A, a polymer sheet 71 is die cut, laser cut, or otherwise incised to form a plurality of pentagonally-shaped bladder panels 41. Various edges of bladder panels 41 are then bonded to each other, as depicted in FIG. 11B, to form some of seams 42. More particularly, edges of bladder panels 41 are placed in an abutting configuration (i.e., one edge contacting or placed proximal to another edge) such that heating the edges causes the formation of a bond and joins the edges together. As an alternative to incising the various pentagonally-shaped bladder panels 41 and joining the edges, a single polymer element having the shape depicted in FIG. 11B may be cut from a polymer sheet. The joined bladder elements 41 are then bent, wrapped, or otherwise conformed such that further edges of bladder panels 41 contact each other and are bonded together to form further seams 42, thereby imparting a generally three-dimensional (and unpressurized) structure depicted in FIG. 11C. An inflation tube 72 is also joined at one of seams 42. The three-dimensional structure of bladder panels 41 is then pressurized and sealed, as depicted in FIG. 11D. More particularly, inflation tube 72 is utilized to inject a pressurized fluid into the three-dimensional structure, and inflation tube 72 is sealed and cut to effectively seal the fluid within bladder 40.

As a variation, bladder panels 41 may be cut from polymer sheet 71 so as to include flanges that assist in bonding. Referring to FIG. 11E, bladder 40 is depicted in a configuration wherein a plurality of flanges 73 extend around bladder panels 41 and in the positions of seams 42. By forming bladder panels 41 to include flanges 73, edges of bladder panels 41 may be more easily held in position during bonding. Either prior to pressurization or following pressurization, flanges 73 may be cut or otherwise removed from bladder 40. In order to impart a relatively smooth aspect to an exterior of bladder 40, the joined bladder panels 41 may be turned inside-out such that flanges 73 face inward.

Based upon the method discussed above, sheet 71 and bladder panels 41 each have a planar configuration. When bladder 40 is pressurized, however, bladder panels 41 may bend or otherwise curve outward to impart a generally spherical shape to bladder 40. That is, whereas bladder panels 41 have a planar configuration, bladder panels 41 may exhibit a curved or non-planar configuration when bladder 40 is pressurized. In some manufacturing methods, the individual bladder panels 41 may be thermoformed to impart a curved shape prior to joining of bladder panels 41 together.

Although inflation tube 72 may be joined with any portion of bladder 40, an efficient process involves joining inflation tube 72 at one of seams 42. Referring to FIG. 12A, inflation tube 72 is depicted in a location where two edges of bladder panels 41 meet and are bonded to form one of seams 42. As an alternative, and as depicted in FIG. 12B, inflation tube 72 is depicted in a location where three corners or angles of bladder panels 41 meet and are bonded to form ends of three seams 42.

Once bladder 40 is formed, bladder 40 may be placed within intermediate layer 30 and casing 20 to substantially complete the manufacture of ball 10. In some manufacturing processes, bladder 40 may be pressurized after being located within casing 20. For example, bladder 40 may be formed in the manner discussed above with inflation tube 72 joined at one of seams 42. Prior to pressurization, bladder 40 may be located within an interior of casing 20 such that inflation tube 72 extends through casing 20 and to an exterior of casing 20. At this stage, the stitching of casing 20 may be substantially completed to encase bladder 40 within ball 10. Inflation tube 72 may then be utilized to inject a pressurized fluid into bladder 40. Inflation tube 72 is then sealed to seal the pressurized fluid within bladder 40. Although inflation tube 72 may be trimmed at this stage of the manufacturing process, portions of inflation tube 72 may also be tucked into or otherwise located within casing 20.

In some manufacturing processes, bladder 40 may be substantially formed from the various bladder panels 41. That is, edges of bladder panels 41 may be joined. In order to impart a relatively smooth aspect to an exterior of bladder 40, the joined bladder panels 41 may be turned inside-out such that seams face inward.

Further Sport Ball Configurations

Casing 20 is discussed above as being formed from casing panels 21, which are stitched or otherwise joined together along abutting sides or edges and formed from materials such as leather, polyurethane, or polyvinyl chloride, for example. As an alternative, casing 20, portions of casing 20, or areas of casing 20 corresponding with casing panels 21 may be formed from fluid-filled chambers. That is, sealed chambers forming a sport ball casing may extend around a sealed bladder (i.e., similar to bladder 40). As an example, a sport ball 80 is depicted in FIG. 13 as including a casing 81 that forms an exterior of ball 80. Casing 81 includes a plurality of chamber panels 82 that are bonded together along abutting edges, but may also be stitched. Chamber panels 82 are depicted as having the shapes of equilateral hexagons and equilateral pentagons. In further configurations of ball 80, however, chamber panels 82 may have a variety of other shapes (e.g., triangular, square, rectangular, trapezoidal, round, oval, non-geometrical) that combine in a tessellation-type manner to form casing 81, and chamber panels 82 may also exhibit non-regular or non-geometrical shapes.

Chamber panels 82 have the configurations of sealed, fluid-filled chambers with curved surfaces that cooperatively impart a spherical aspect to ball 80. One of chamber panels 82 is depicted in FIG. 14 as including an outer barrier 83 and an inner tensile member 84. Barrier 83 is formed from a polymer material that is sealed to contain a pressurized fluid within. Tensile member 84 is formed from a textile or polymer foam that is bonded or otherwise secured to opposite sides of barrier 83 and placed in tension to restrain outward movement of surfaces of barrier 83. Although chamber panels 82 may be formed through a variety of processes and may have a variety of configurations, chamber panels 82 may be formed through any of the processes and may have any of the configurations disclosed in U.S. patent application Ser. Nos. 12/123,612 and 12/123,646, which were both filed in the U.S. Patent and Trademark Office on 20 May 2008 and are incorporated herein by reference.

Referring to FIG. 15, a cross-sectional view through a portion of ball 80 is depicted. Whereas casing 81 forms an exterior of ball 80, a bladder 85 forms an interior of ball 80. Bladder 85 has the general configuration of bladder 40 discussed above and, therefore, is a sealed polymer element that encloses a pressurized fluid. As with bladder 40, bladder 85 may also be formed from a plurality of panels that are joined together to form the sealed and valveless structure. Given this structure, an exterior of ball 10 is effectively formed from a plurality of sealed fluid-filled chambers (i.e., chamber panels 82), whereas an interior of ball 10 is effectively formed from a single fluid-filled bladder (i.e., bladder 85). Moreover, inner surfaces of chamber panels 82 contact and bear against an outer surface of bladder 85. In some configurations, the inner surfaces of chamber panels 82 and the outer surface of bladder 85 may be formed from the same element, or an intermediate layer or other elements may extend between casing 81 and bladder 85.

CONCLUSION

Bladder 40 is discussed above as having a sealed and valveless configuration. An advantage to this configuration is that ball 10 may have more uniform balance and bounce characteristics than a sport ball with a valve. That is, a valve provides a discontinuity within a sport ball that (a) may affect the weight distribution, and therefore the balance, of the sport ball and (b) may affect the manner in which the sport ball bounces when the point of impact is at or proximal to the valve. Accordingly, various performance characteristics of ball 10 may be enhanced by eliminating a valve.

The invention is disclosed above and in the accompanying drawings with reference to a variety of configurations. The purpose served by the disclosure, however, is to provide an example of the various features and concepts related to the invention, not to limit the scope of the invention. One skilled in the relevant art will recognize that numerous variations and modifications may be made to the configurations described above without departing from the scope of the present invention, as defined by the appended claims.

The invention claimed is:

1. A sport ball comprising:
   a casing that forms at least a portion of an exterior surface of the ball, the casing including a first number of casing panels joined along abutting edges;
   at least one casing panel including a fluid-filled chamber comprising:
   an outer barrier formed of a polymer material that defines an interior void; a tensile member located within the interior void and bonded to opposite sides of the barrier, the tensile member being formed from a textile element that includes a pair of spaced layers joined by a plurality of connecting members, each of the layers having an edge, at least a portion of one of the edges having a finished configuration; a fluid located within the interior void, the fluid being pressurized to place an outward force upon the barrier and induce tension in at least a portion of the connecting members; and wherein ends of yarn forming the layers are substantially absent from the edges;
   a bladder comprising a plurality of panels located within the casing, the bladder comprising alternating layers of material including a first center layer, a second adjacent layer and a third adjacent layer, wherein the first center layer is disposed between the second adjacent layer and the third adjacent layer;
   wherein the first center layer is formed of a material that includes an ethylene-vinyl copolymer, wherein the second adjacent layer is formed of a material that includes a thermoplastic polyurethane, and wherein the third adjacent layer is formed of a material that includes a thermoplastic polyurethane;
   wherein the second adjacent layer and the third adjacent layer are both joined to the first center layer on opposite sides to form the bladder; and
   an intermediate layer located between the casing and the bladder and separating the casing from the bladder.

2. The sport ball recited in claim 1, wherein each of the casing panels have a first shape, and each bladder panel has the first shape.

3. The sport ball recited in claim 2, wherein the bladder is initially inflated with a gas having a first diffusion rate that is lower than a second diffusion rate of atmospheric gasses.

4. The sport ball recited in claim 1, wherein a portion of the casing panels have a first shape and another portion of the casing panels have a second shape, and a group of bladder panels have the first shape and another group of bladder panels have the second shape.

5. The sport ball recited in claim 4, wherein the first shape is pentagonal and the second shape is hexagonal.

6. The sport ball recited in claim 1, wherein the bladder has a sealed and valveless structure that encloses a pressurized gas.

7. The sport ball recited in claim 1, wherein the bladder includes a valve.

8. The sport ball recited in claim 1, wherein at least one bladder panel include an ether-based thermoplastic polyurethane material.

9. A sport ball comprising:
   a casing that forms at least a portion of an exterior surface of the ball, the casing including a first number of casing panels joined along abutting edges;
   at least one casing panel including a fluid-filled chamber comprising: an outer barrier formed of a polymer material that defines an interior void; a tensile member located within the interior void and bonded to opposite sides of the barrier, the tensile member being formed from a textile element that includes a pair of spaced layers joined by a plurality of connecting members, each of the layers having an edge, at least a portion of one of the edges having a finished configuration; a fluid located within the interior void, the fluid being pressurized to place an outward force upon the barrier and induce tension in at least a portion of the connecting members; and wherein ends of yarn forming the layers are substantially absent from the edges;
   a bladder located within the casing, the bladder comprising multiple layers of material including a first center layer, a second layer and a third layer, wherein the first center layer is disposed between the second layer and the third layer, and wherein the first center layer is joined to both the second layer and the third layer;
   wherein the first center layer is formed of a first material, the second layer is formed of a second material, and the third layer is formed of the second material, wherein the second material is different from the first material;
   the bladder also comprising a fourth layer and a fifth layer;
   wherein the second layer is disposed between fourth layer and the first central layer and wherein the second layer is joined to the fourth layer;

wherein the third layer is disposed between the fifth layer and the first layer and wherein the third layer is joined to the fifth layer;

wherein the fourth layer is formed of a third material and the fifth layer is also formed of the third material, wherein the third material is different than the second material, and the third material is also different than the first material.

10. The sport ball recited in claim 9, wherein the first center layer is formed of a material that includes an ethylene-vinyl copolymer, wherein the second layer is formed of a material that includes a thermoplastic polyurethane, and wherein the third layer is formed of a material that also includes a thermoplastic polyurethane.

11. The sport ball recited in claim 10, wherein the fourth layer is formed of a material that includes a regrind of thermoplastic polyurethane and ethylene-vinyl copolymer, and wherein the fifth layer is also formed of a material that includes a regrind of thermoplastic polyurethane and ethylene-vinyl copolymer.

12. The sport ball recited in claim 9, wherein the bladder is initially inflated with a gas having a first diffusion rate that is lower than a second diffusion rate of atmospheric gasses.

13. The sport ball recited in claim 9, wherein the bladder has a sealed and valveless structure that encloses a pressurized gas.

14. The sport ball recited in claim 9, wherein the bladder includes a valve.

* * * * *